United States Patent
Cockcroft et al.

(10) Patent No.: US 9,459,767 B2
(45) Date of Patent: Oct. 4, 2016

(54) TABLET WEB VISUAL BROWSING

(75) Inventors: Oliver N. Cockcroft, Los Gatos, CA (US); Sachin Suhas Kittur, San Jose, CA (US); Anirudh Arvind Natekar, Pleasanton, CA (US); Ravikumar Arumugam, San Jose, CA (US)

(73) Assignee: eBay Inc., San Jose, CA (US)

( * ) Notice: Subject to any disclaimer, the term of this patent is extended or adjusted under 35 U.S.C. 154(b) by 144 days.

(21) Appl. No.: 13/595,363

(22) Filed: Aug. 27, 2012

(65) Prior Publication Data

US 2013/0227441 A1    Aug. 29, 2013

Related U.S. Application Data

(60) Provisional application No. 61/528,593, filed on Aug. 29, 2011.

(51) Int. Cl.
G06F 3/14        (2006.01)
G06F 3/0482   (2013.01)
(Continued)

(52) U.S. Cl.
CPC ........... *G06F 3/0482* (2013.01); *G06F 3/0485* (2013.01); *G06F 3/04817* (2013.01); *G06F 3/04883* (2013.01); *G06F 17/30873* (2013.01)

(58) Field of Classification Search
CPC .................................. G06F 3/14; G06F 3/17
USPC ......... 715/200–277, 700–867; 700/701–866; 709/201–229; 705/14.66, 26.14, 1, 2, 705/10, 14, 14.1, 26.1; 345/30–111; 707/104.1, 709, 748, 706; 358/3.27; 1/1
IPC ................................................ G06F 3/14, 3/17
See application file for complete search history.

(56) References Cited

U.S. PATENT DOCUMENTS 7,502,786 B2    3/2009  Liu et al.
8,626,530 B1 *  1/2014  Tran et al. .................... 705/2
(Continued)

FOREIGN PATENT DOCUMENTS

CN    101553836 A    10/2009
CN    104011708 A     8/2012
(Continued)

OTHER PUBLICATIONS

"International Application Serial No. PCT/US2012/052710, Search Report mailed Nov. 6, 2012", 2 pgs.
(Continued)

*Primary Examiner* — Ruay Ho
(74) *Attorney, Agent, or Firm* — Schwegman, Lundberg & Woessner, P.A.

(57) ABSTRACT

In various embodiments, systems and methods for providing tablet web visual browsing is provided. In example embodiments, a landing webpage having a plurality of categories from which a user at a mobile device may begin a non-textual navigation sequence to navigate to an item of interest is provided. A first non-textual input of the non-textual navigation sequence that indicates a selection of a category is received from the mobile device. A plurality of subcategories of the selected category and a search result having a plurality of item selections identified based on the selected category are determined. At least one further non-textual input of the non-textual navigation sequence is received that causes adjustment to a visualization of the plurality of item selections to facilitate non-textual navigation to the item of interest. The adjusted visualization of the plurality of item selections is provided for display on the mobile device.

20 Claims, 20 Drawing Sheets

(51) Int. Cl.
*G06F 17/30* (2006.01)
*G06F 3/0485* (2013.01)
*G06F 3/0488* (2013.01)
*G06F 3/0481* (2013.01)

(56) References Cited

U.S. PATENT DOCUMENTS

| | | | |
|---|---|---|---|
| 8,700,495 B2* | 4/2014 | Battle | G06Q 30/00 705/26.1 |
| 9,081,533 B1* | 7/2015 | West | G06F 3/1272 |
| 2003/0097357 A1 | 5/2003 | Ferrari et al. | |
| 2006/0092474 A1* | 5/2006 | Ramsay et al. | 358/3.27 |
| 2007/0162298 A1* | 7/2007 | Melton et al. | 705/1 |
| 2008/0005668 A1 | 1/2008 | Mavinkurve et al. | |
| 2008/0098311 A1 | 4/2008 | Delarue et al. | |
| 2008/0201368 A1* | 8/2008 | Lee et al. | 707/104.1 |
| 2008/0222144 A1 | 9/2008 | Backer et al. | |
| 2009/0024467 A1* | 1/2009 | Fontoura et al. | 705/14 |
| 2009/0132388 A1 | 5/2009 | Omori et al. | |
| 2009/0287655 A1 | 11/2009 | Bennett | |
| 2009/0292595 A1* | 11/2009 | Tonnison | G06Q 30/02 705/14.1 |
| 2010/0077344 A1 | 3/2010 | Gaffney et al. | |
| 2010/0135582 A1 | 6/2010 | Gokturk et al. | |
| 2010/0161378 A1* | 6/2010 | Josifovski et al. | 705/10 |
| 2011/0093361 A1 | 4/2011 | Morales | |
| 2012/0054041 A1* | 3/2012 | Williams | 705/14.66 |
| 2012/0054060 A1* | 3/2012 | Kundu | 705/26.5 |
| 2012/0158739 A1* | 6/2012 | Ah-Pine et al. | 707/748 |
| 2012/0271735 A1* | 10/2012 | Saffer | 705/26.41 |
| 2012/0303599 A1* | 11/2012 | Patil | 707/706 |
| 2013/0046748 A1* | 2/2013 | Bennett | 707/709 |

FOREIGN PATENT DOCUMENTS

| | | |
|---|---|---|
| KR | 1020060070289 A | 6/2006 |
| WO | WO-2008042822 A2 | 4/2008 |
| WO | WO-2013033120 A1 | 3/2013 |

OTHER PUBLICATIONS

"International Application Serial No. PCT/US2012/052710, Written Opinion mailed Nov. 6, 2012", 4 pgs.

"European Application Serial No. 12826733.3, Office Action mailed Apr. 25, 2014", 1 pg.

"European Application Serial No. 12826733.3, Response filed Jul. 1, 2014", 6 pgs.

"International Application Serial No. PCT/US2012/052710, International Preliminary Report on Patentability mailed Mar. 13, 2014", 6 pgs.

"Australian Application Serial No. 2012302093, First Examiner Report mailed Feb. 24, 2015", 3 pgs.

"Australian Application Serial No. 2012302093, Response filed Aug. 27, 2015 to First Examiner Report mailed Feb. 24, 2015", 20 pgs.

"Canadian Application Serial No. 2,847,063, Office Action mailed Sep. 18, 2015", 3 pgs.

"Chinese Application Serial No. 201280049377.5, Voluntary Amendment filed Dec. 11, 2014", with English translation of claims, 14 pgs.

"European Application Serial No. 12826733.8. Extended European Search Report mailed Dec. 7, 2015", 8 pgs.

"Korean Application Serial No. 2014-7008226, Office Action mailed Jun. 17, 2015", with English translation of claims, 9 pgs.

"Korean Application Serial No. 2014-7008226, Response filed Sep. 16, 2015 to Office Action mailed Jun. 17, 2015", with English translation of claims, 30 pgs.

"Canadian Application Serial No. 2,847,063, Response filed Mar. 18, 2016 to Office Action mailed Sep. 18, 2015", 21 pgs.

"Chinese Application Serial No. 201280049377.5, Office Action mailed Jan. 29, 2016", with English translation of claims, 18 pgs.

"Korean Application Serial No. 2014-7008226, Final Office Action mailed Jan. 21, 2016", with English translation of claims, 6 pgs.

\* cited by examiner

TABLET WEB VISUAL BROWSING

CROSS REFERENCE TO RELATED APPLICATION

The present application claims the priority benefit of U.S. Provisional Patent Application Ser. No. 61/528,593 filed on Aug. 29, 2011 and entitled "Tablet Web Visual Browsing," which is incorporated herein by reference.

FIELD

The present disclosure relates generally to data processing and in a specific example embodiment, to providing tablet web visual browsing.

BACKGROUND

Typically when a user browses a website in search of information, the user will enter a keyword to start the process. Once search results are returned, the user may refine the search by providing filters using text, other keyboard inputs, or mouse movements. While these types of inputs work well on a device with a real keyboard and mouse, it may be inconvenient for a user of a tablet or mobile device to that does not have a real keyboard to search for information.

BRIEF DESCRIPTION OF DRAWINGS

Various ones of the appended drawings merely illustrate example embodiments of the present invention and cannot be considered as limiting its scope.

DETAILED DESCRIPTION

The description that follows includes systems, methods, techniques, instruction sequences, and computing machine program products that embody illustrative embodiments of the present invention. In the following description, for purposes of explanation, numerous specific details are set forth in order to provide an understanding of various embodiments of the inventive subject matter. It will be evident, however, to those skilled in the art that embodiments of the inventive subject matter may be practiced without these specific details. In general, well-known instruction instances, protocols, structures, and techniques have not been shown in detail.

In various embodiments, systems and methods for providing web visual browsing are provided. In example embodiments, a landing webpage having a plurality of categories from which a user at a mobile device may begin a non-textual navigation sequence to navigate to an item of interest is provided. In one embodiment, the mobile device is a tablet. A first non-textual input of the non-textual navigation sequence that indicates a selection of a category is received from the mobile device. A plurality of subcategories of the selected category and a search result having a plurality of item selections identified based on the selected category are determined. At least one further non-textual input of the non-textual navigation sequence is received that causes adjustment to a visualization of the plurality of item selections to facilitate non-textual navigation to the item of interest. The adjusted visualization of the plurality of item selections is provided for display on the mobile device.

As such, the user may navigate a website and arrive at a set of information that is of interest to the user on their mobile or wireless device without having to use a virtual keyboard or external input device. For some users, the virtual keyboard may be challenging to use. For example, the user may have large fingers that make typing on a small virtual keyboard difficult. By allowing the user to navigate for information using non-textual inputs (e.g., swipes, taps), the user can more quickly and easily arrive at the final set of information that is of interest to the user. Therefore, one or more of the methodologies discussed herein may obviate a need for time-consuming data entry and searching by the user. This may have the technical effect of reducing computing resources used by one or more devices within the system. Examples of such computing resources include, without limitation, processor cycles, network traffic, memory usage, storage space, and power consumption.

Figure 1:
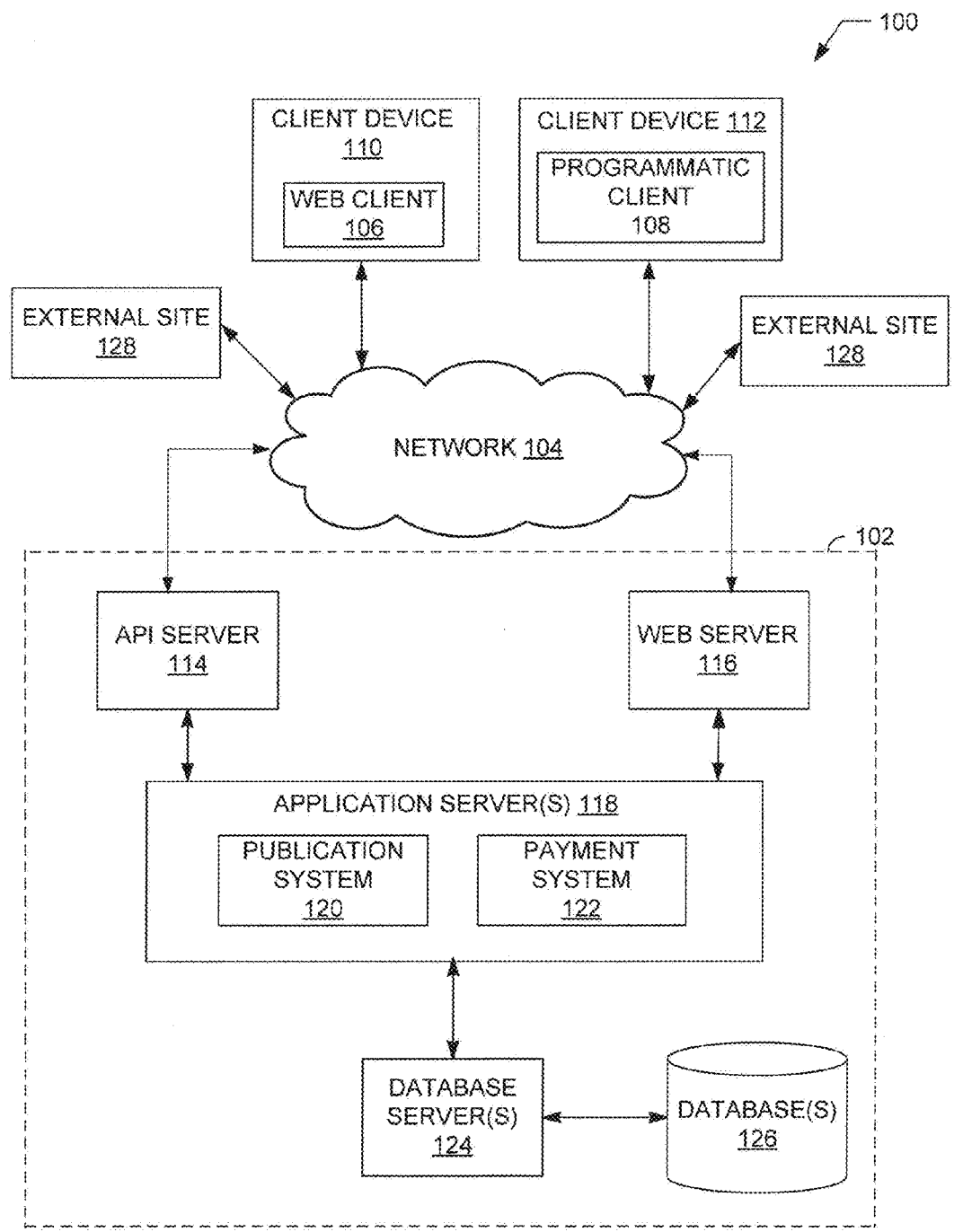
FIG. 1 is a block diagram illustrating an example environment in which embodiments of a system for providing tablet web visual browsing may be implemented.

With reference to FIG. 1, an example embodiment of a high-level client-server-based network architecture 100 to enable tablet web visual browsing is shown. A networked system 102, in an example form of a network-server-side functionality, is coupled via a communication network 104 (e.g., the Internet, wireless network, cellular network, or a Wide Area Network (WAN)) to one or more client devices 110 and 112. FIG. 1 illustrates, for example, a web client 106 operating via a browser (e.g., such as the INTERNET EXPLORER® browser developed by Microsoft® Corporation of Redmond, Wash. State), and a programmatic client 108 executing on respective client devices 110 and 112.

The client devices 110 and 112 may comprise a tablet, mobile phone, laptop, or any other communication device that a user may utilize to access the networked system 102. In some embodiments, the client device 110 may comprise a display module (not shown) to display information (e.g., in the form of user interfaces). In further embodiments, the client device 110 may comprise one or more of a touch screen, accelerometer, camera, microphone, and GPS device. The client devices 110 and 112 may be a device of a user, which is used to perform a transaction involving goods or services within the networked system 102 or to access information on the networked system 102. In one embodiment, the networked system 102 is a network-based marketplace that manages digital goods, publishes publications comprising item listings of products available on the network-based marketplace, and manages payments for these marketplace transactions. In a more generic embodiment, the networked system 102 may be a publication system that publishes information that may be accessed by the client devices 110 and 112.

An Application Program Interface (API) server 114 and a web server 116 are coupled to, and provide programmatic and web interfaces respectively to, one or more application servers 118. The application servers 118 host a publication system 120 and a payment system 122, each of which may comprise one or more modules, applications, or engines, and each of which may be embodied as hardware, software, firmware, or any combination thereof. The application servers 118 are, in turn, coupled to one or more database servers 124 facilitating access to one or more information storage repositories or database(s) 126. In one embodiment, the information storage repositories 126 are storage devices that store information to be posted (e.g., publications or listings) to the publication system 120. The information storage repositories 126 may also store goods and item information in accordance with example embodiments.

In example embodiments, the publication system 120 publishes content on a network (e.g., Internet). As such, the publication system 120 provides a number of publication and marketplace functions and services to users that access the networked system 102. The publication system 120 is discussed in more detail in connection with FIG. 2. In example embodiments, the publication system 120 is discussed in terms of a marketplace environment. However, it is noted that the publication system 120 may be associated with a non-marketplace environment such as an informational (e.g., search engine) or social networking environment.

The payment system 122 provides a number of payment services and functions to users. The payment system 122 allows users to accumulate value (e.g., in a commercial currency, such as the U.S. dollar, or a proprietary currency, such as points, miles, or other forms of currency provide by a private entity) in their accounts, and then later to redeem the accumulated value for products (e.g., goods or services) that are made available via the publication system 120 or elsewhere on the network 104. The payment system 122 also facilitates payments from a payment mechanism (e.g., a bank account, PayPal™, or credit card) for purchases of items via any type and form of a network-based marketplace.

While the publication system 120 and the payment system 122 are shown in FIG. 1 to both form part of the networked system 102, it will be appreciated that, in alternative embodiments, the payment system 122 may form part of a payment service that is separate and distinct from the networked system 102. Additionally, while the example network architecture 100 of FIG. 1 employs a client-server architecture, a skilled artisan will recognize that the present disclosure is not limited to such an architecture. The example network architecture 100 can equally well find application in, for example, a distributed or peer-to-peer architecture system. The publication system 120 and payment system 122 may also be implemented as standalone systems or standalone software programs operating under separate hardware platforms, which do not necessarily have networking capabilities.

Figure 2:
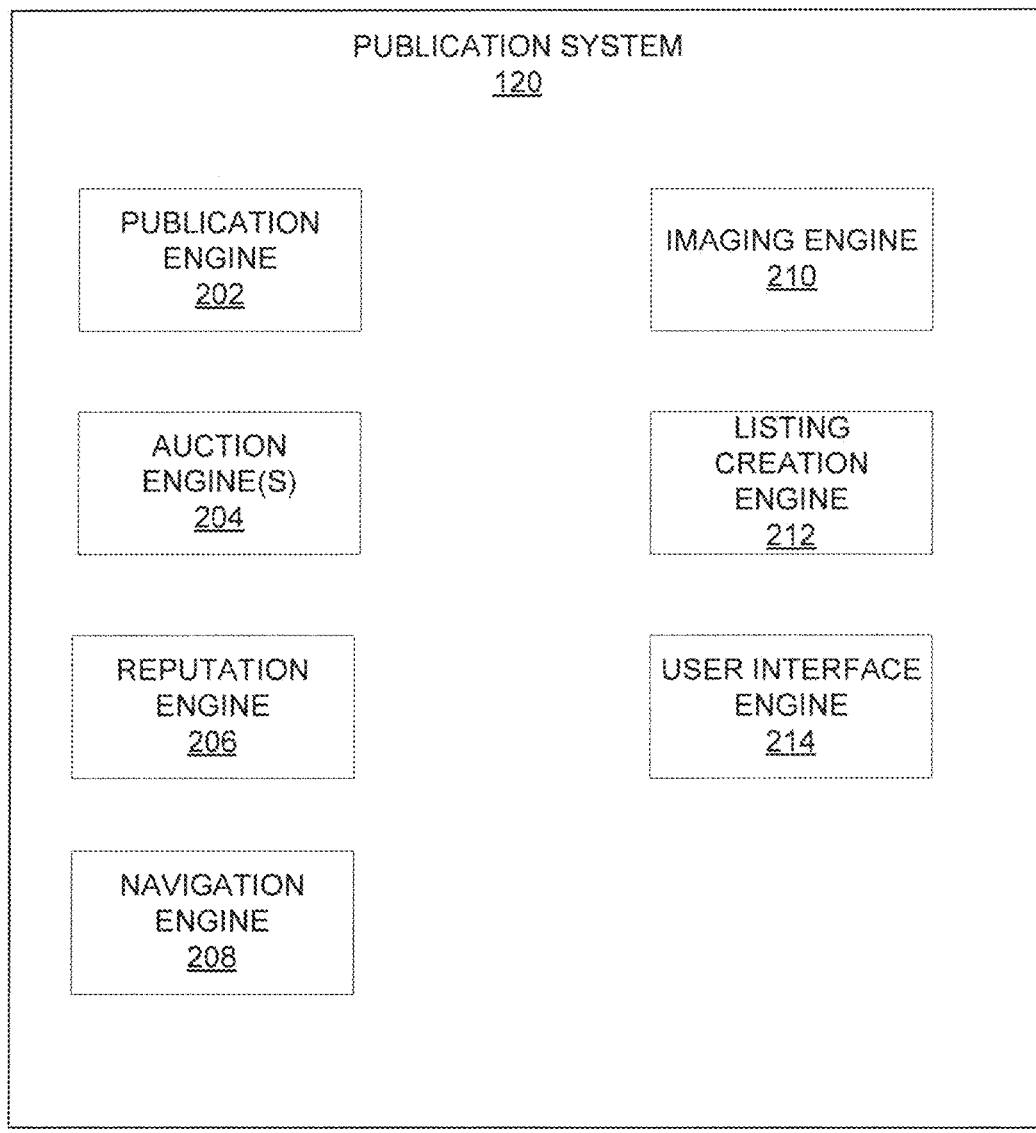
FIG. 2 is a block diagram of an example embodiment of a publication system.

Referring now to FIG. 2, an example block diagram illustrating multiple components that, in one embodiment, are provided within the publication system 120 of the networked system is shown. In this embodiment, the publication system 120 is a marketplace system where items (e.g., goods or services) may be offered for sale. The items may comprise digital goods (e.g., currency, license rights), virtual goods, and real goods. The publication system 120 may be hosted on dedicated or shared server machines (not shown) that are communicatively coupled to enable communications between the server machines. The multiple components themselves are communicatively coupled (e.g., via appropriate interfaces), either directly or indirectly, to each other and to various data sources, to allow information to be passed between the components or to allow the components to share and access common data. Furthermore, the components may access the one or more information storage repositories 126 via the one or more database servers 124.

The publication system 120 provides a number of publishing, listing, and price-setting mechanisms whereby a seller may list (or publish information concerning) goods or services for sale, a buyer can express interest in or indicate a desire to purchase such goods or services, and a price can be set for a transaction pertaining to the goods or services. To this end, the publication system 120 may comprise at least one publication engine 202. The publication engine 202 publishes information, such as item listings or product description pages, on the publication system 120.

The publication system 120 also comprises one or more auction engines 204 that support auction-format listing and price setting mechanisms (e.g., English, Dutch, Chinese, Double, Reverse auctions, etc.). The auction engines 204 may also support fixed-price listings and price setting mechanisms A reputation engine 206 allows users that transact, utilizing the networked system 102, to establish, build, and maintain reputations. These reputations may be made available and published to potential trading partners. Because the publication system 120 supports person-to-person trading between unknown entities, in accordance with one embodiment, users may otherwise have no history or other reference information whereby the trustworthiness and credibility of potential trading partners may be assessed. The reputation engine 206 allows a user, for example through feedback provided by one or more other transaction partners, to establish a reputation within the network-based marketplace over time. Other potential trading partners may then reference the reputation for purposes of assessing credibility and trustworthiness.

Navigation of the network-based marketplace may be facilitated by a navigation engine 208. For example, the navigation engine 208 allows users to browse various categories, catalogs, or inventory data structures according to which listings may be classified within the publication system 120. The navigation engine 208 will be discussed in more detail in connection with FIG. 3 below.

In order to make listings available via the networked system 102 as visually informing and attractive as possible, the publication system 120 may include an imaging engine 210 that enables users to upload images for inclusion within publications and to incorporate images within viewable listings.

A listing creation engine 212 allows users (e.g., sellers) to conveniently author listings of items. In one embodiment, the listings pertain to goods or services that a user (e.g., a seller) wishes to transact via the publication system 120. In other embodiments, a user may create a listing that is an advertisement or other form of publication. Each good or service is associated with a particular category. The listing creation engine 212 may receive listing data such as title, description, one or more images of the item or good, and aspect name/value pairs from which to generate listings. Furthermore, each listing for a good or service may be assigned an item identifier. The listing may be stored to one or more storage devices (e.g., storage repositories 126).

A user interface engine 214 generates or causes the generation of graphical user interfaces for display on the client device (e.g., client device 110). In some embodiments, the user interface engine 214 may generate a layout or otherwise organize the information for display on the client device 110. The user interface engine 214 may then provide instructions to a browser application of the client device 110 to render the graphical user interface on the client device 110 (e.g., a tablet). In some embodiments, the user interface engine 214 may include or have access to one or more scripting modules, engines, or APIs for processing and including various types of content in generated user interfaces and web pages. Additionally, the user interface engine 214 may include or have access to one or more device libraries to enable generated web pages or user interfaces to be optimized for a particular device. The user interfaces facilitate interaction with data by the user of the client device 110.

Although the various components of the publication system 120 have been defined in terms of a variety of individual modules and engines, a skilled artisan will recognize that many of the items can be combined or organized in other ways and that not all modules or engines need to be present or implemented in accordance with example embodiments. In alternative embodiments, some of the modules and engines of the publication system 120 may be found instead of, or in addition to, the publication system 120 at the client devices 110 and 112. Furthermore, not all components of the marketplace system 120 have been included in FIG. 2. In general, components, protocols, structures, and techniques not directly related to functions of exemplary embodiments (e.g., dispute resolution engine, loyalty promotion engine, personalization engines, etc.) have not been shown or discussed in detail. The description given herein simply provides a variety of exemplary embodiments to aid the reader in an understanding of the systems and methods used herein.

Figure 3:
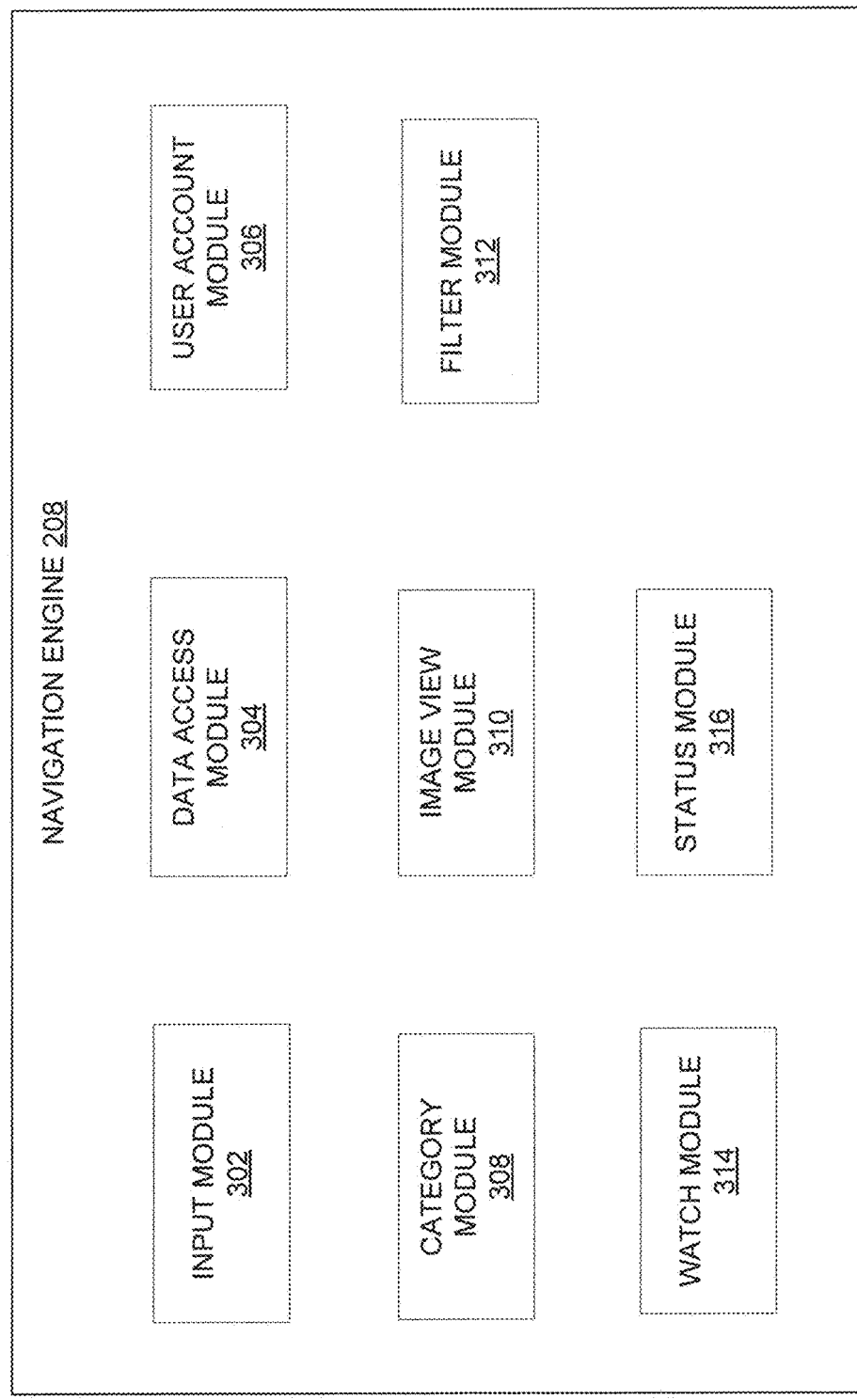
FIG. 3 is a block diagram of an example embodiment of a navigation engine.

FIG. 3 is a block diagram of an example embodiment of the navigation engine 208. The navigation engine 208 allows the publication system 120 to provide web visual browsing to a mobile device having a touchscreen, such as a tablet. In example embodiments, the navigation engine 208 allows users to navigate through various categories, catalogs, or inventory data structures according to which listings may be classified within the publication system 120. For example, the navigation engine 208 allows a user to successively navigate down a category tree comprising a hierarchy of categories and subcategories until a particular listing of interest is reached. Various other navigation applications within the navigation engine 208 are provided to supplement the searching and browsing applications. In one embodiment, the navigation engine 208 may record the various user actions (e.g., swipes, taps) performed by the user in order to navigate down the category tree. To this end, the navigation engine 208 comprises an input module 302, a data access module 304, a user account module 306, a category module 308, an image view module 310, a filter module 312, a watch module 314, and a status module 316.

As discussed above, the user interface engine 214 provides a website graphical user interface (generically referred to as a "user interface") that may be navigated by the navigation engine 208. For example, a user may initially access the publication system 120 by accessing a landing page (e.g., homepage) of the publication system 120. The landing page may display multiple categories of items, with each category being represented in part by a visual image on the user interface. The user interface may include selectable elements (e.g., buttons, tabs, arrows) that provide functionality for presenting more information (e.g., expanding categories that are displayed, providing filters) or triggering an action (e.g., adding to a watch list, providing status).

The input module 302 receives and analyzes inputs from a mobile device. For example, within a user interface, categories and sub-categories may be traversed using touch gestures (e.g., swipes and taps on a touchscreen) as inputs. It is also contemplated that other non-textual inputs such as left or right arrow selections and mouse inputs (e.g., selection of a left arrow or right arrow on the user interface) may be used to navigate among categories and subcategories. It is noted that the term subcategories is used herein to refer to any level of subcategories (e.g., sub-subcategories or leaf nodes in category tree) in a hierarchy below a main category. The input module 302 receives these non-textual inputs and determines actions to be performed based on the input. For example, if the non-textual input is a selection of a particular category (e.g., by tapping on a category selection), the input module 302 triggers the data access module 304 to access appropriate information (e.g., for the selected category), if needed, from the information storage repository and triggers the category module 308 to manage the category and sub-category information. In another example, if the input is a watch selection, then the input module 302 may trigger the watch module 314 to add the selected item listing to a watch list of the user.

It is noted that with each input received by the input module 302, the navigation engine 208 along with the user interface engine 214 may continually refresh the user interface to display refined items, item listings, or additional information. Further, the user interface may be characterized by a lack of pagination. Instead, a scrolling effect among items may be facilitated by the user interface by constant retrieval of the information (e.g., item listings) by the data access module 304 based on the latest received input.

The user account module 306 manages user specific information on the user interface. If the user is logged in or otherwise known to the publication system 120, the user account module 306 accesses account information for the user and may customize the user interface to the user. For example, the landing page for the user may include user specific information such as, for example, a list of items the user is watching, a list of items the user is bidding on or has purchased, and saved searches.

The category module 308 manages a category hierarchy of the publication system 120. When a selection of a particular category is received by the input module 302, the category module 308 determines the sub-categories to be displayed to the user along with items within the selected category. Similarly, if a sub-category is selected, the category module 308 determines if any further sub-categories (of the selected sub-category) are available.

The image view module 310 manages various views for presenting categories and items within the categories. In some embodiments, the image view module 310 causes the presentation of a visual slider bar on the user interface. The visual slider bar changes a number of items shown on the user interface as well as size of items that are shown. For example, by sliding the visual slider bar by one granularity level, the number of items shown in the user interface decreases, with the amount of user interface space devoted to each remaining item in the user interface increases. The increase in user interface space for each remaining item may be allocated to increasing the size of the image of the item, increasing an amount of information about the item (e.g., price, description, title, shipping options), or both. Sliding the visual slider bar another granularity level in the same direction may further decrease the number of items shown in the user interface, while further enlarging the images of the remaining items. At a higher or highest level of granularity, all textual information about the item may be hidden such that only images of the items are shown.

In other embodiments, the image view module 310 may present items in a slideshow, whereby each slide of the slideshow represents an item via its item image(s). The user may scroll through each slide of the slideshow by using a touch gesture (e.g., swiping or selecting an arrow button).

In some embodiments, additional information about an item may be shown by selecting the item with a non-textual input. In response, an enlarged or pop-up window is caused to be displayed by the image view module 310. The enlarged or pop-up window may include one or more enlarged images of the item and additional information about the item such as description, price, time remaining on the item, seller, and so forth.

The filter module 312 allows the users to filter display items by selecting filter options. These filter options may be presented on a menu on the user interface. As the filters are applied by the filter module 312, the user interface is refreshed to display the items that satisfy the filter criteria. In some embodiments, the filtering and refreshing are performed in real time or near-real time. The filtering and refreshing of items may apply to different item visualization schemes including illustration of images only for items, illustration of an image and minimal information about items, and illustration of more information and smaller images for the items. These various illustrations will be discussed in more detail below.

The watch module 314 manages a watch list of the user. In example embodiments, a user navigates down to a particular item described in an item listing and may decide to include the item in a watch list. Accordingly, a watch selection (e.g., a watch icon or button) may be provided on the item listing, the selection of which triggers the watch module 314 to add the item to the watch list of the user. Subsequently, watched items may be visually distinguished from non-watched items on the user interface. For example, watch list items may be highlighted in a particular color to distinguish them from non-watch list items. The watch list concept may be abstracted further to distinguish items of different status from other items. For example, items whose auctions are ending soon may be emphasized in a particular manner (e.g., using a specific flag or color) versus items whose auctions are not ending soon.

The status module 316 manages the status of items. In some embodiments, the status module 316 may access or retrieve the status information (e.g., from the data access module 304) and in some cases, visually emphasize the item listing based on their status. The status of an item may include, for example, an auction time remaining for the item, an outbid status, a shipping status, or a customer service status (e.g., item return, item question).

Although the various components of the navigation engine 208 and the publication system 120 have been discussed in terms of a variety of individual modules and engines, a skilled artisan will recognize that many of the items can be combined or organized in other ways. Furthermore, not all components of the navigation engine 208 and the publication system 120 may have been included in FIGS. 2 and 3. In general, components, protocols, structures, and techniques not directly related to functions of example embodiments have not been shown or discussed in detail.

Additionally, some of the modules may be located elsewhere in the publication system 120. The description given herein simply provides a variety of example embodiments to aid the reader in an understanding of the systems and methods used herein.

Figure 4A:
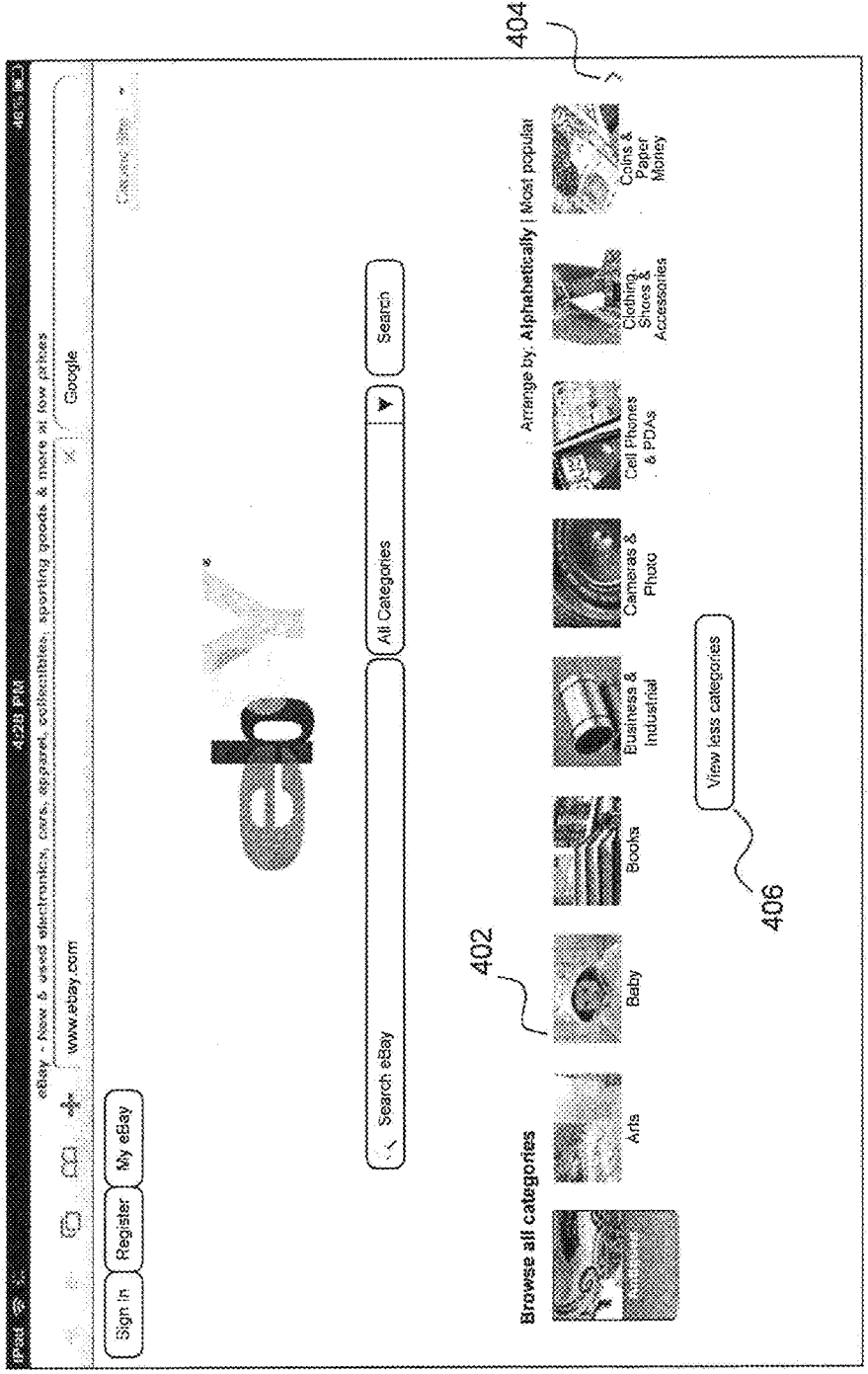
FIG. 4a-4g are example screenshots of one embodiment for providing tablet web visual browsing.

FIG. 4a-4g are example screenshots of one embodiment for providing web visual browsing. With reference to FIG. 4a, a screenshot of an example homepage 400 is shown. This example homepage 400 is a minimized view landing page. In example embodiments, the navigation engine 208, using an agent string from the user's device, can identify that the user is on a mobile device such as a tablet. Once identified, a redirect may be performed to send the device to a tablet web, smartphone web, or other similar mobile or wireless device web. The example homepage 400 provides a minimized category list 402 having category selections organized in a row from which the user may start a search using non-textual inputs. Each category selection in the category list 402 has an image assigned to it to give the user a vague idea of what is contained within each category. The user may scroll through the category list 402 to view other categories by tapping an arrow button 404 or swiping the row in a particular direction.

Figure 4B:
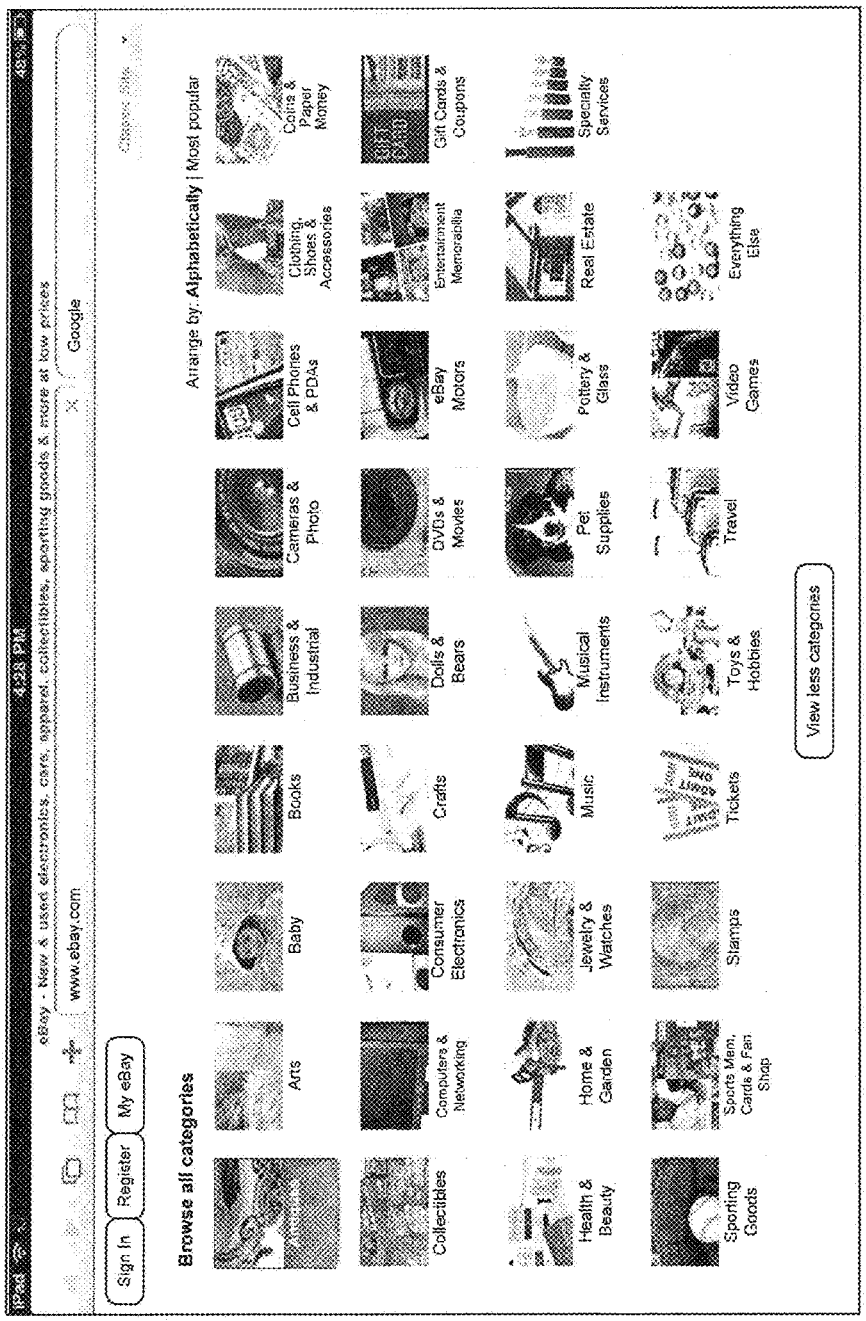

Alternatively by tapping a "view more categories" button 406, a user interface 410 shown in the screenshot of FIG. 4b may be presented. The user interface 410 expands the category list 402 of FIG. 4a into a full screen matrix of all categories. Similarly to FIG. 4a, each category selection has an image assigned to it to give the user a vague idea of what is contained within the category.

Figure 4C:
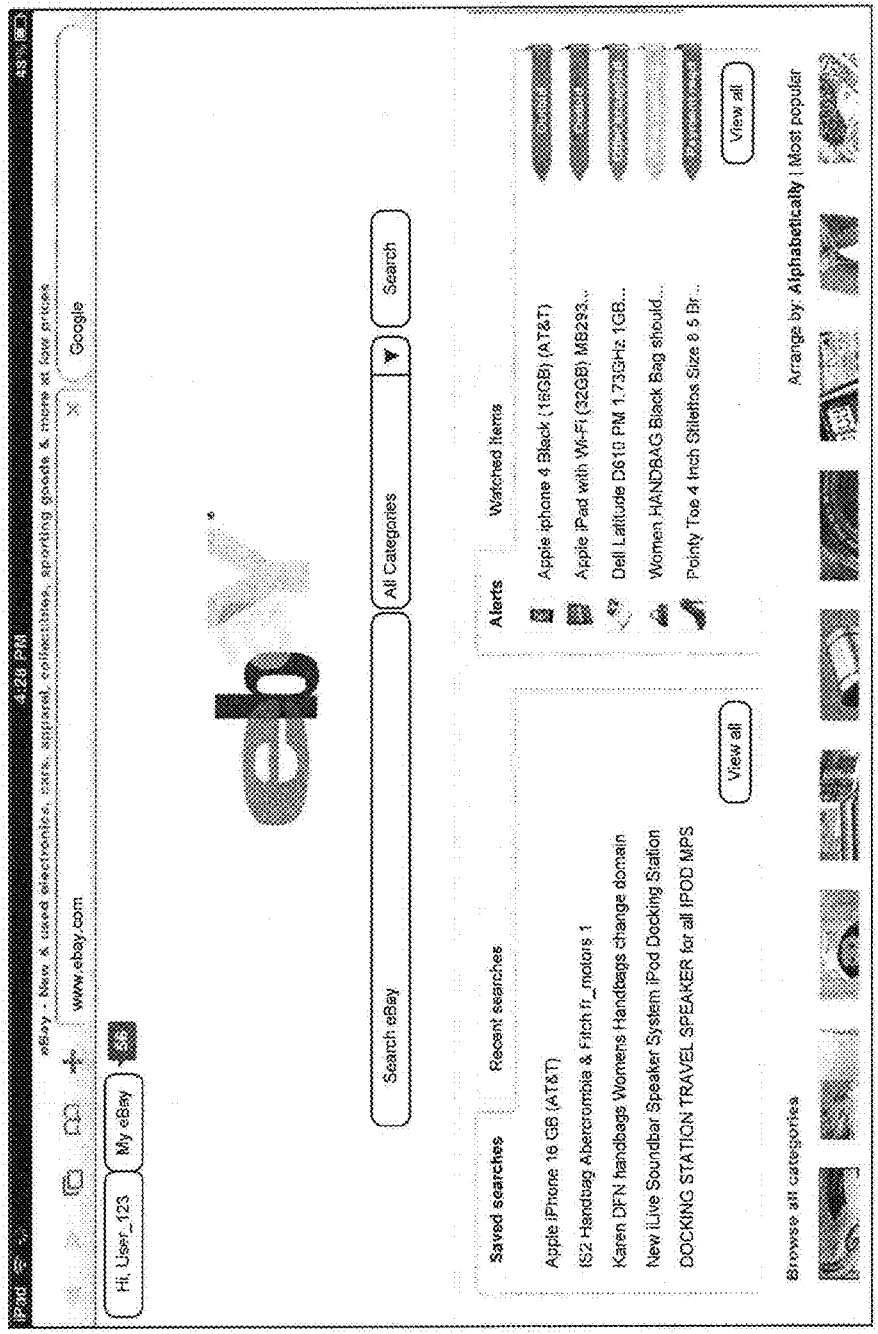

In an alternative embodiment whereby the user is signed in (e.g., logged in) to a mobile web application (e.g., tablet web or smartphone web), the user is presented with more personalized information on the landing page as shown in a screenshot 420 of FIG. 4c. The screenshot 420 shows a top portion that includes saved searches, recent searches, alerts for items associated with the user, and watched items. Thus, when the user logs in or is otherwise known to the publication system 120, the user account module 306 may access account information for the user such as their watch list and present this information on the landing page. Alerts (e.g., determined by the status module 316) for items associated with the user may include that the user is outbid on an item, that an offer has been accepted on an item, that the user won or lost an item, that payment is required for an item, that feedback is requested for an item, and so forth. Below the customized information in the top portion is a category list similar to that shown in FIG. 4a or a matrix of all categories as shown in FIG. 4b. The user may access these categories by, for example, scrolling down on the landing page.

Figure 4D:
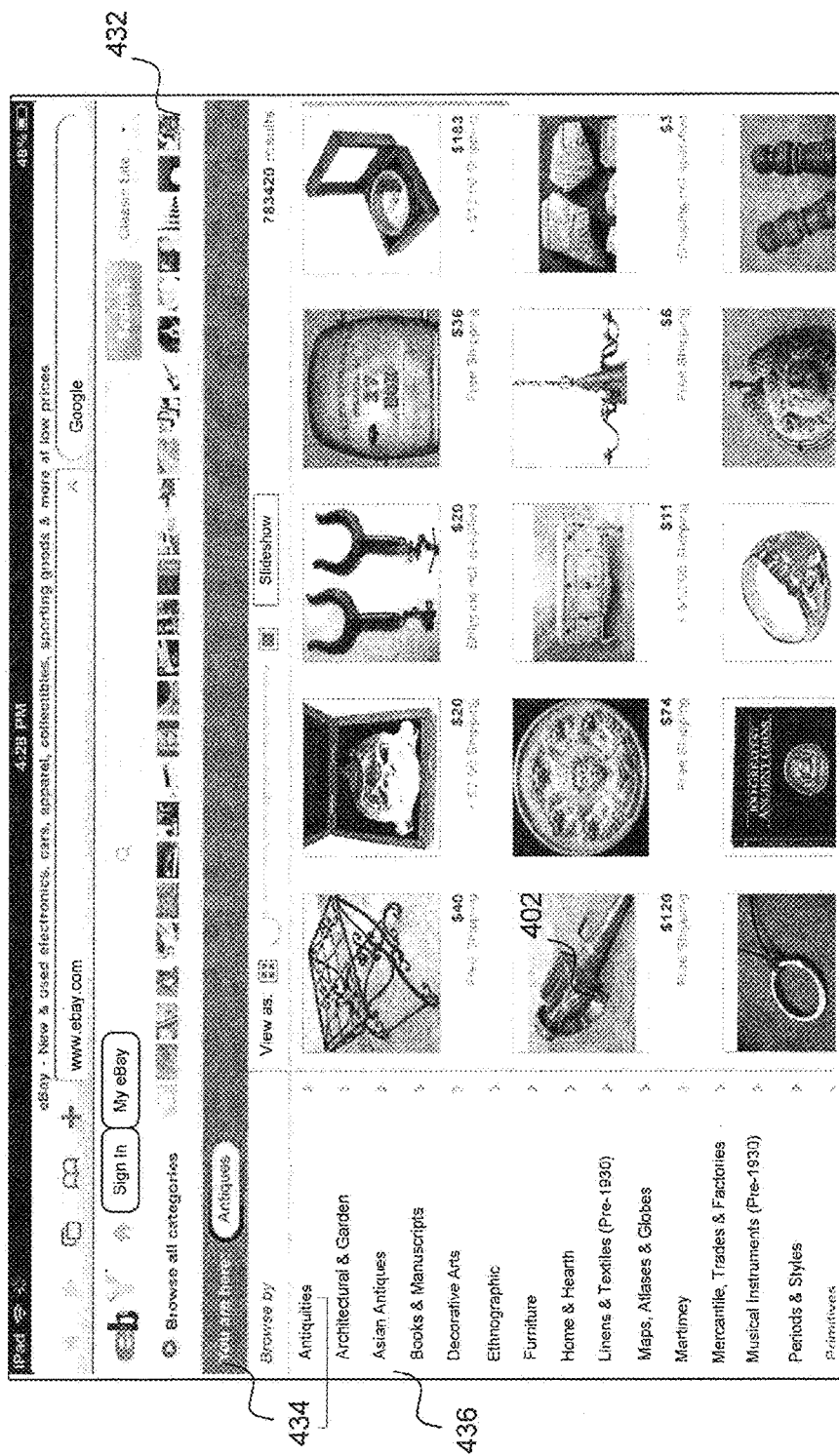

Once the user selects a category by tapping on a category selection, a user interface 430 showing items from the selected category is presented as illustrated in FIG. 4d. At a top of the user interface 430, a minimized category bar 432 of all the categories is provided such that the user can easily navigate to a different category from within a subcategory. The category selections in the category bar 432 are minimized for display. However, if the user taps on the category bar 432, the category bar 432 expands such that the names of the categories and their corresponding image are enlarged as shown in FIG. 4e.

Referring back to FIG. 4d, a "you are here" bar 434 (also referred to as a text bar) indicates each level of category/subcategory the user has selected to arrive at the user interface 430. In this example, the user has only selected an antiques category as shown in the "you are here" bar 434. On a left side of the user interface 430, a subcategory display 436 is provided. The user may select a further subcategory in order to narrow the search results. Some of the search results are presented in a main portion 438 of the user interface 430. In the present example, the search results show an item selection having an image of an item along with a current price. It is noted that any type or amount of information may be presented on each item selection. The user may view more search result item selections by scrolling down on the user interface 430.

With each selection of a subcategory (e.g., from the subcategory display 436), the search results adapt and become more focused. In one embodiment, a best match algorithm may be used to determine the search results to be displayed. Additionally, the search results may be sorted, for example, by item listings/selections with higher resolution images appearing higher in the search results.

Figure 4E:
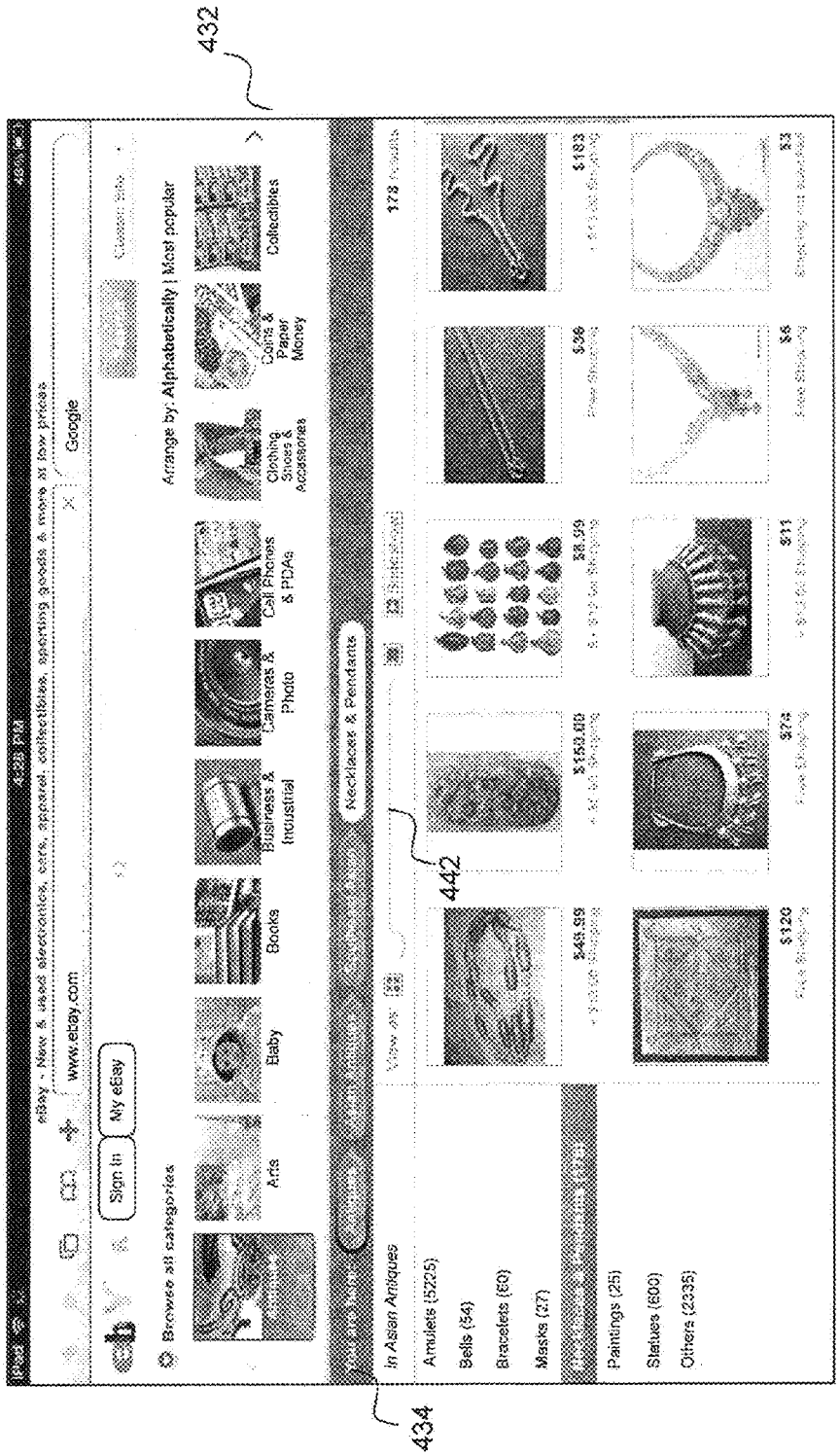
Figure 4F:
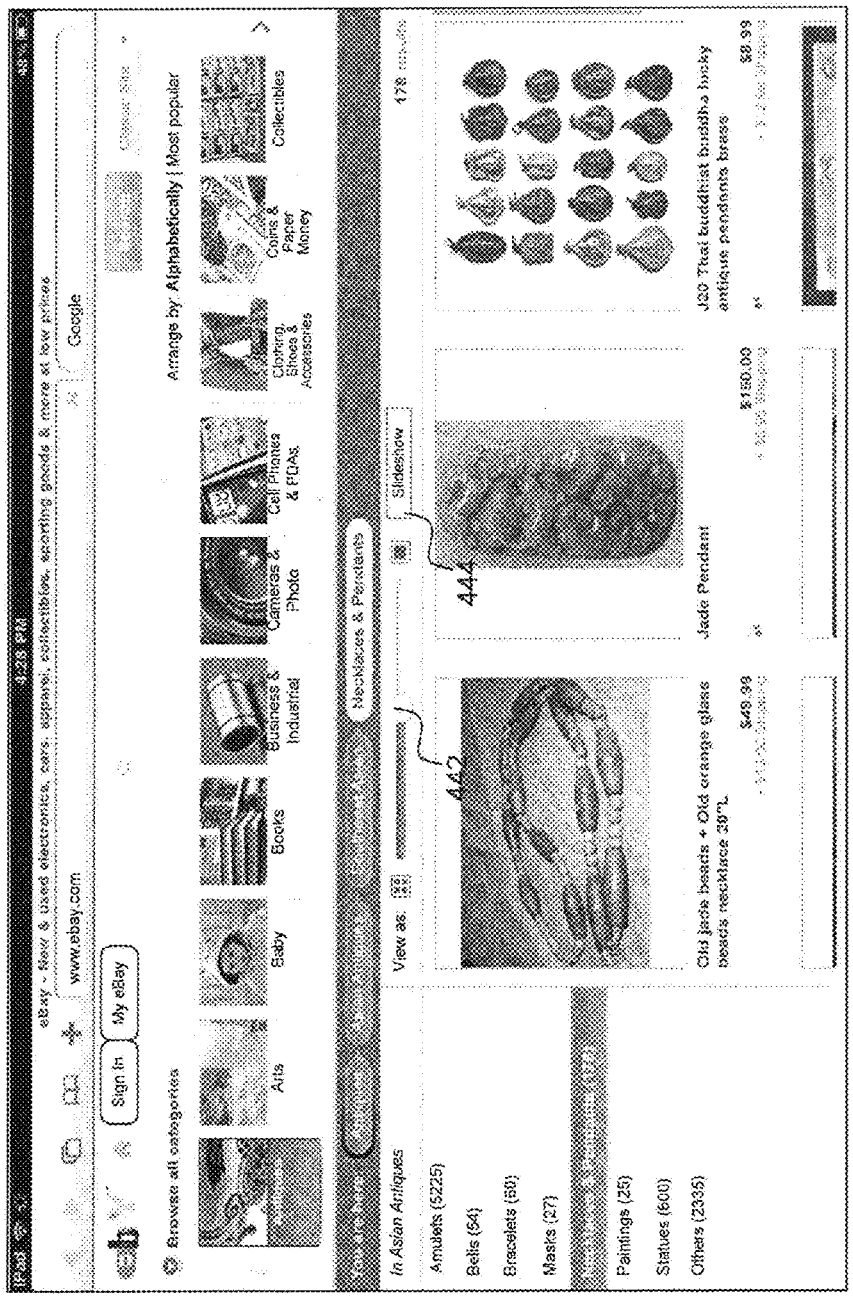

Referring to FIG. 4e, a user interface 440 showing filtered search results is provided. In the present example, the user has narrowed down the items by successively selecting subcategories Asian Antiques, Southeast Asian, and Necklaces & Pendants. The "you are here" bar 434 expands to display each subsequent selection of a subcategory and the search results are refreshed or updated in real-time to provide item selections in response. As such, the user has navigated from the landing page to specific items of interest using only four non-textual inputs (e.g., the selection of Antiques, Asian Antiques, Southeast Asian, and Necklaces & Pendants) in this example.

Also shown in the user interface 440 of FIG. 4e is a slider bar 442. The slider bar 442 allows the user to change a view of the item selections displayed in the main portion. That is, the slider bar 442 makes the item selections bigger or smaller. For example, the slider bar 442 has been moved to the right in FIG. 4f. As a result, the item selections have increased in size on the user interface 440. Additionally, more information may be displayed in each item selection (e.g., title or description). By moving the slider bar 442 all the way to the right, only one item selection may be shown according to one embodiment. Alternative embodiments may contemplate any number of item selections being provided based on various locations on the slider bar 442.

Figure 4G:
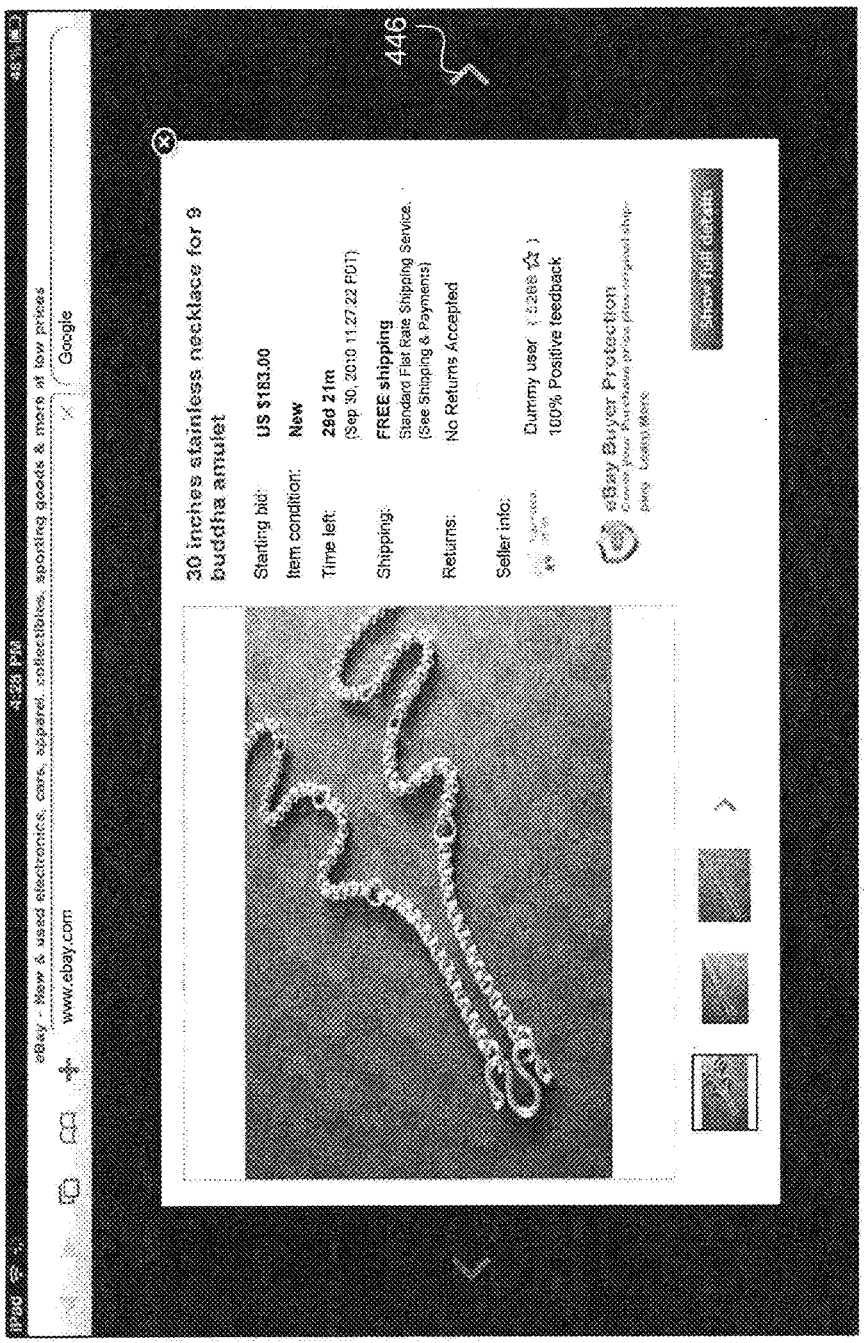

The user interface 440 also provides a slideshow selection 444. By selecting the slideshow selection 444, the user is presented with a slide for each item selection as shown in FIG. 4g. The slide may include a large image of the item of interest, additional images, and additional information for the item such as starting bid, item condition, time remaining on auction, shipping terms, return terms, seller information. The user may scroll through the slideshow by swiping to the left or right to view the next slide. Alternatively, the user may tap an arrow button 446 to move to the next slide.

Figure 5A:
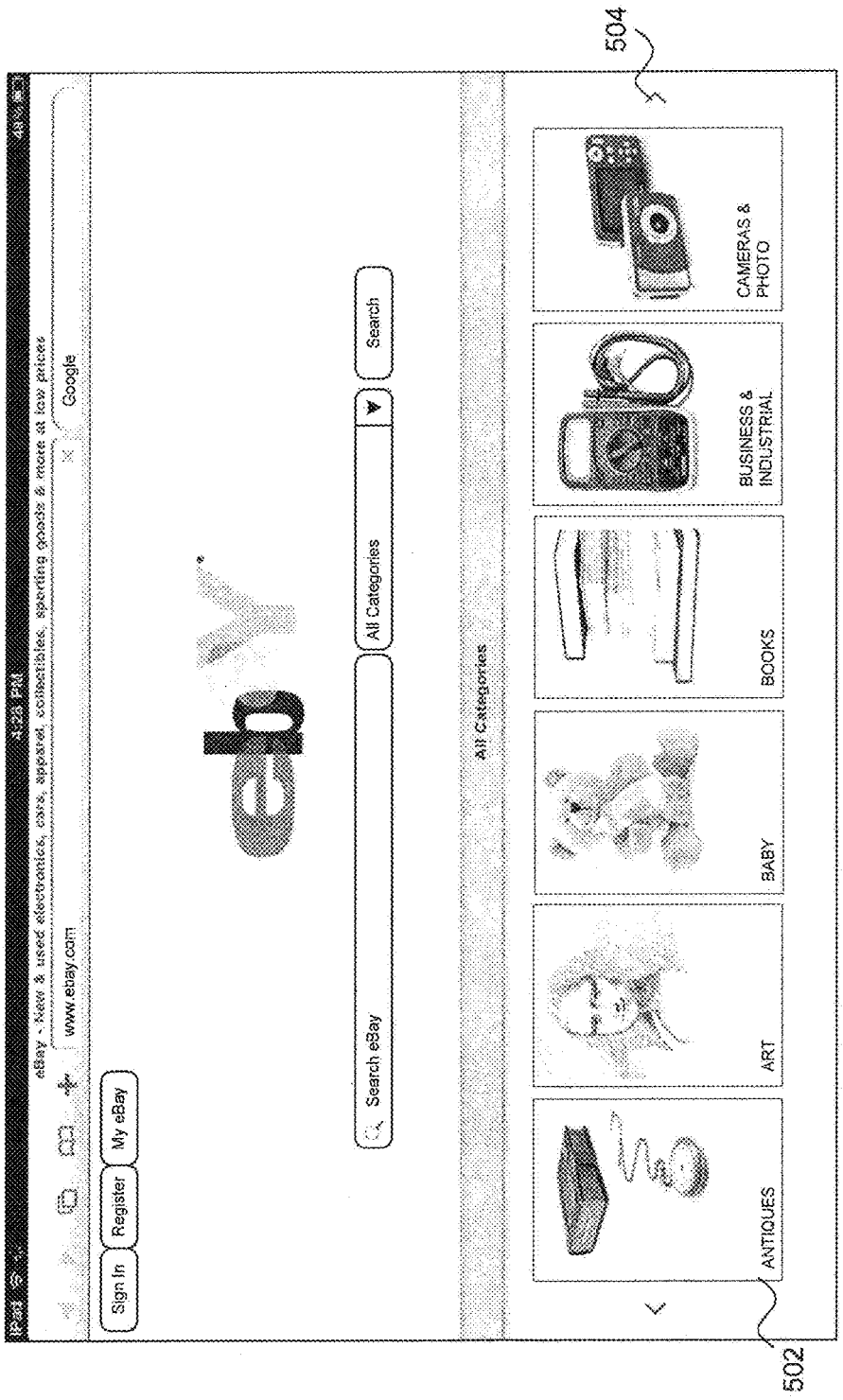
FIG. 5a-5f are example screenshots of another embodiment for providing tablet web visual browsing.

FIG. 5a-5f are example screenshots of another embodiment for providing web visual browsing to a mobile device. FIG. 5a provides an alternative version of a landing page 500. The landing page comprises larger category selections 502 and arrow buttons 504 to view more category selections.

Figure 5B:
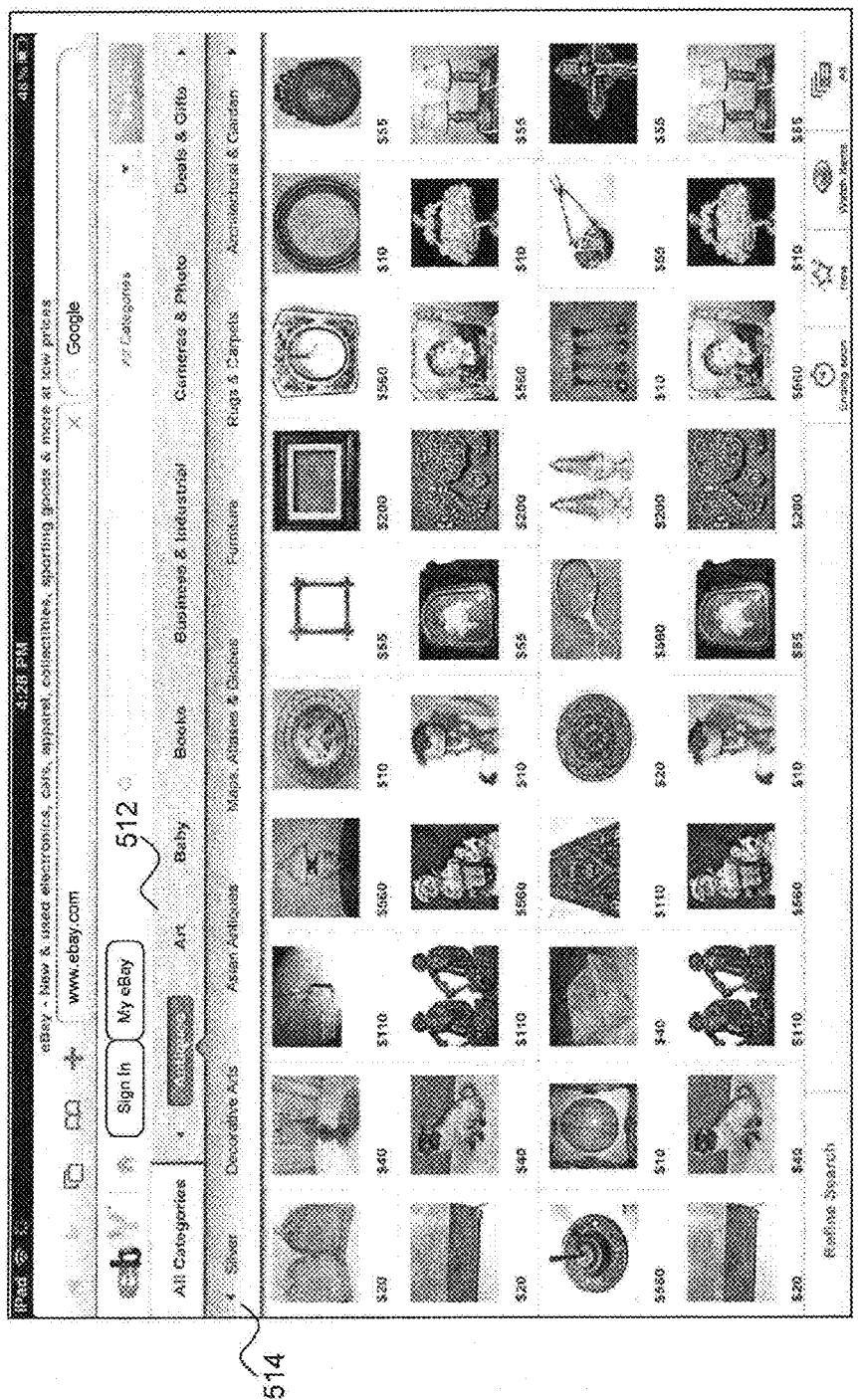

Based on a selection of a category from the category selections 502, a user interface 510 of FIG. 5b may be displayed. In this embodiment, a series of text bars are provided across a top of user interface 510 with further text bars appended vertically based on the navigation. For example, a category (text) bar 512 provides a list of categories that the user may select from in order to immediately switch to a different category without returning to the landing page 500. Below the category bar 512 is a subcategory (text) bar 514. As subcategories are selected, the user interface engine 214 or the category module 308 adds another text bar to enable selection of a next level of subcategory. Thus in the present example, the user has selected the antiques category as shown in the category bar 512. As a result, the subcategory bar 514 displays subcategories of the antiques category.

Figure 5C:
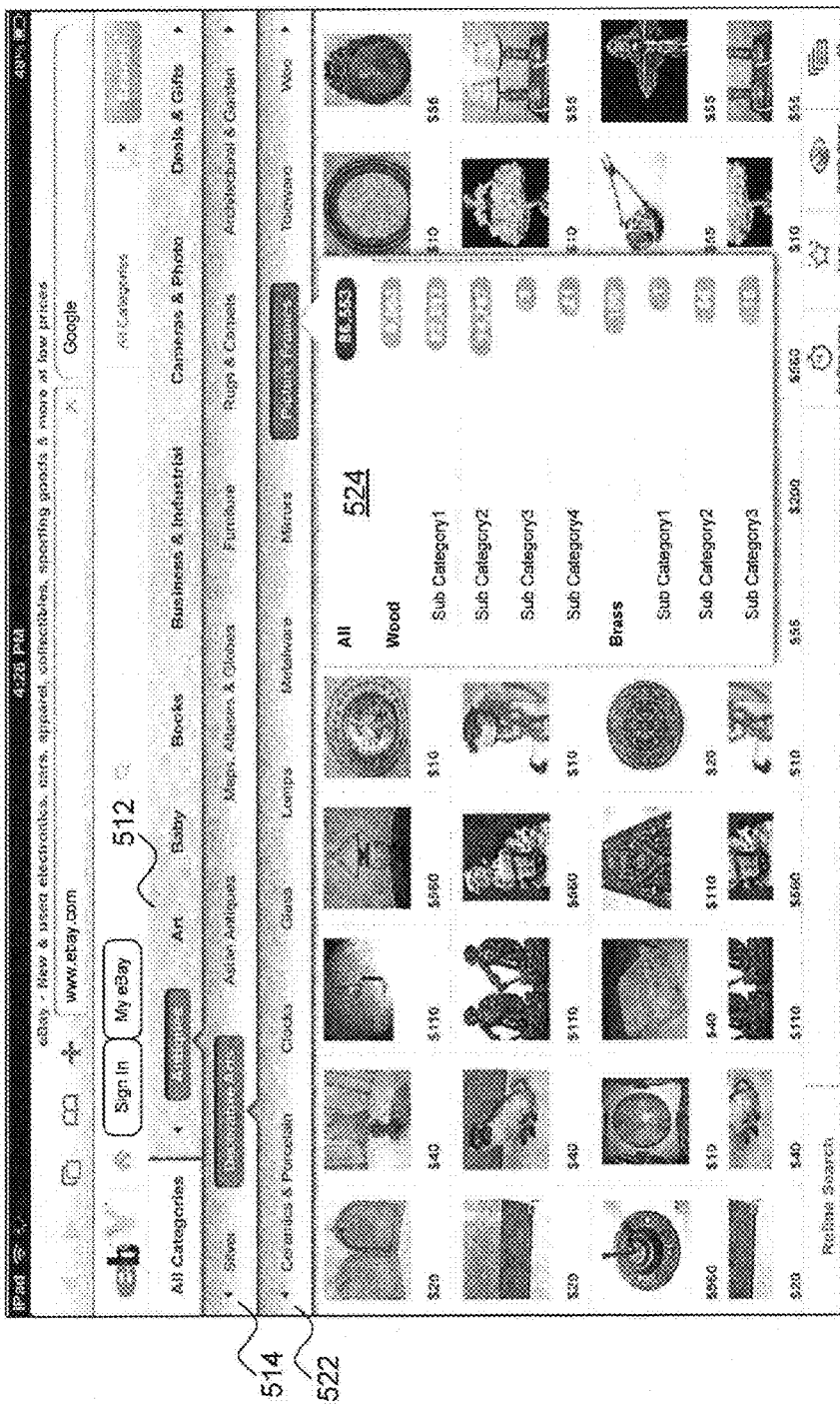

Continuing to FIG. 5c, a screenshot 520 is now shown whereby the subcategory "decorative arts" is chosen in the subcategory bar 514. As a result, a further subcategory bar 522 is presented that provides subcategories within "decorative arts." Additionally, the item selections displayed in a search result area are updated accordingly to only show items selections within that subcategory. Depending on the category and a number of available subcategories (and further subcategories), the text bars may continue to be appended until no further subcategory selections are available. Alternatively, a dropdown menu 524 may be provided in order to see remaining subcategories (e.g., leaf nodes or sub-subcategories).

Figure 5D:
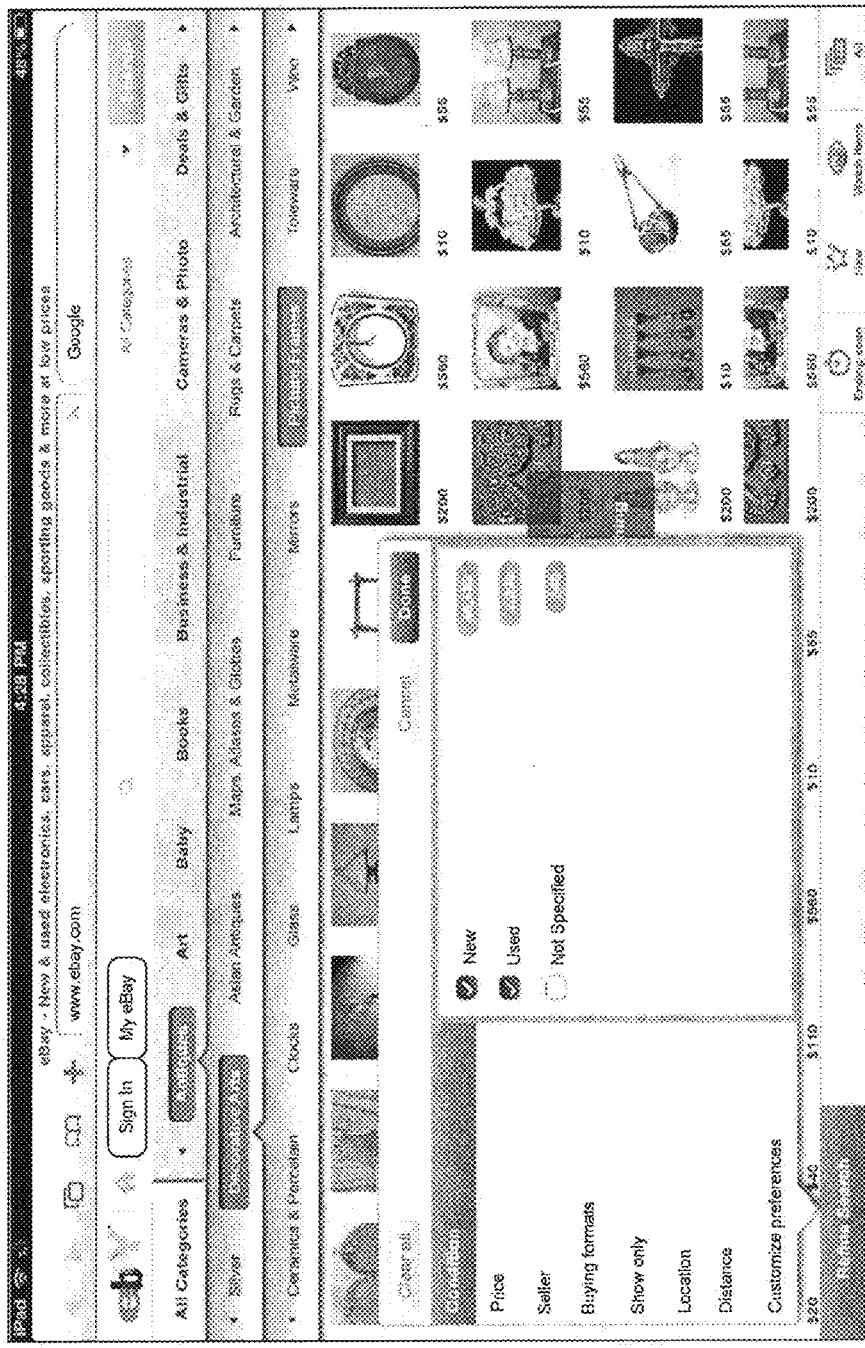

Refinements may be performed (e.g., by the navigation engine 208) by selecting a refinement button 530 as shown in FIG. 5d. Selecting the refinement button 520 triggers a display of filters that the user may select from. For example, the user can focus on condition of the item, price, ratings of sellers, and so forth. Once the filters are selected, the filter module 312 may update the item selections that are displayed in the result section.

Figure 5E:
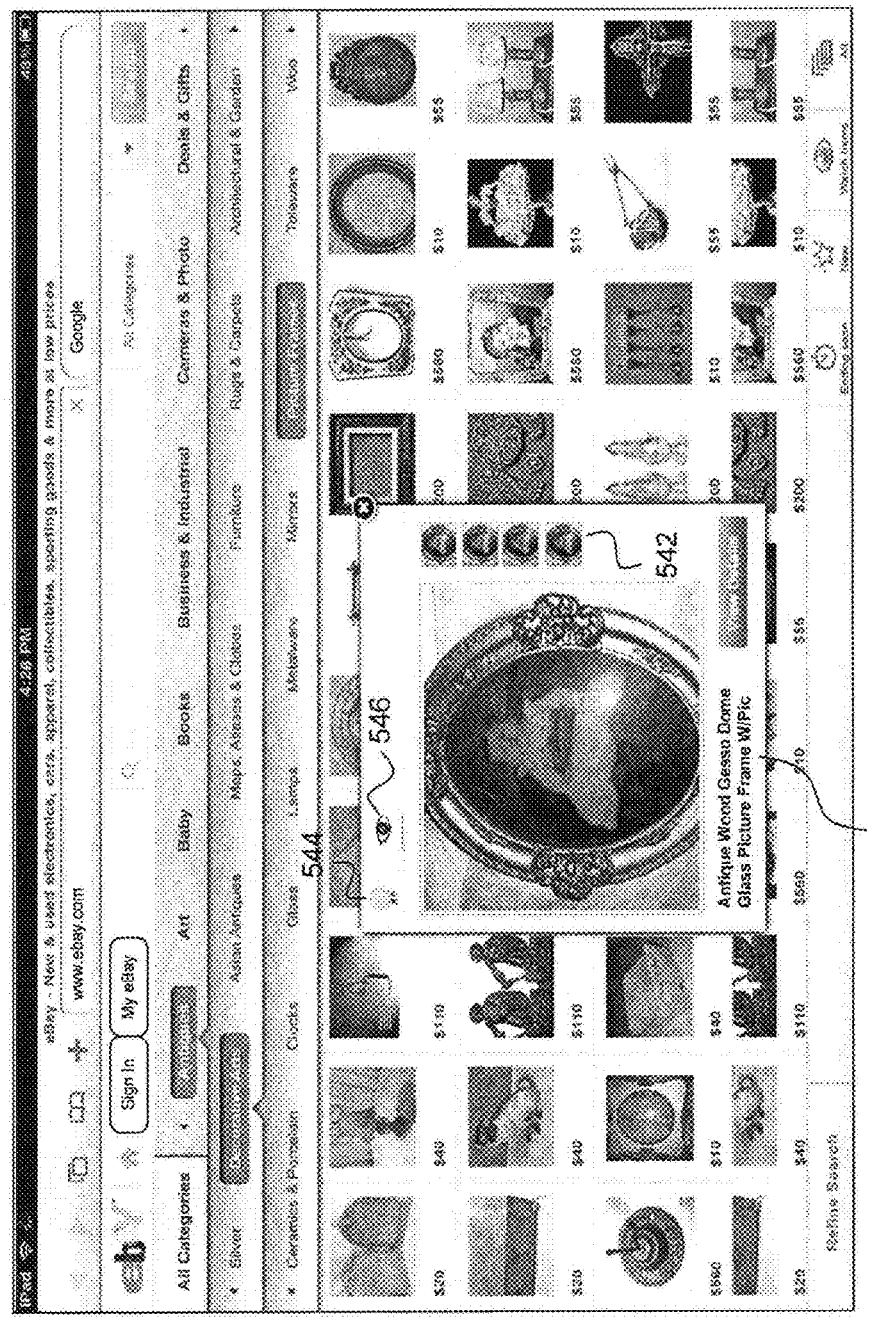

When a user taps on one of the item selections, a preview pop-up 540, as shown in FIG. 5e, may be provided that presents a larger image of the item. If there are multiple images, the user may be able to flip through the multiple images or select from the images on a right side 542 of the preview pop-up 540.

Figure 5F:
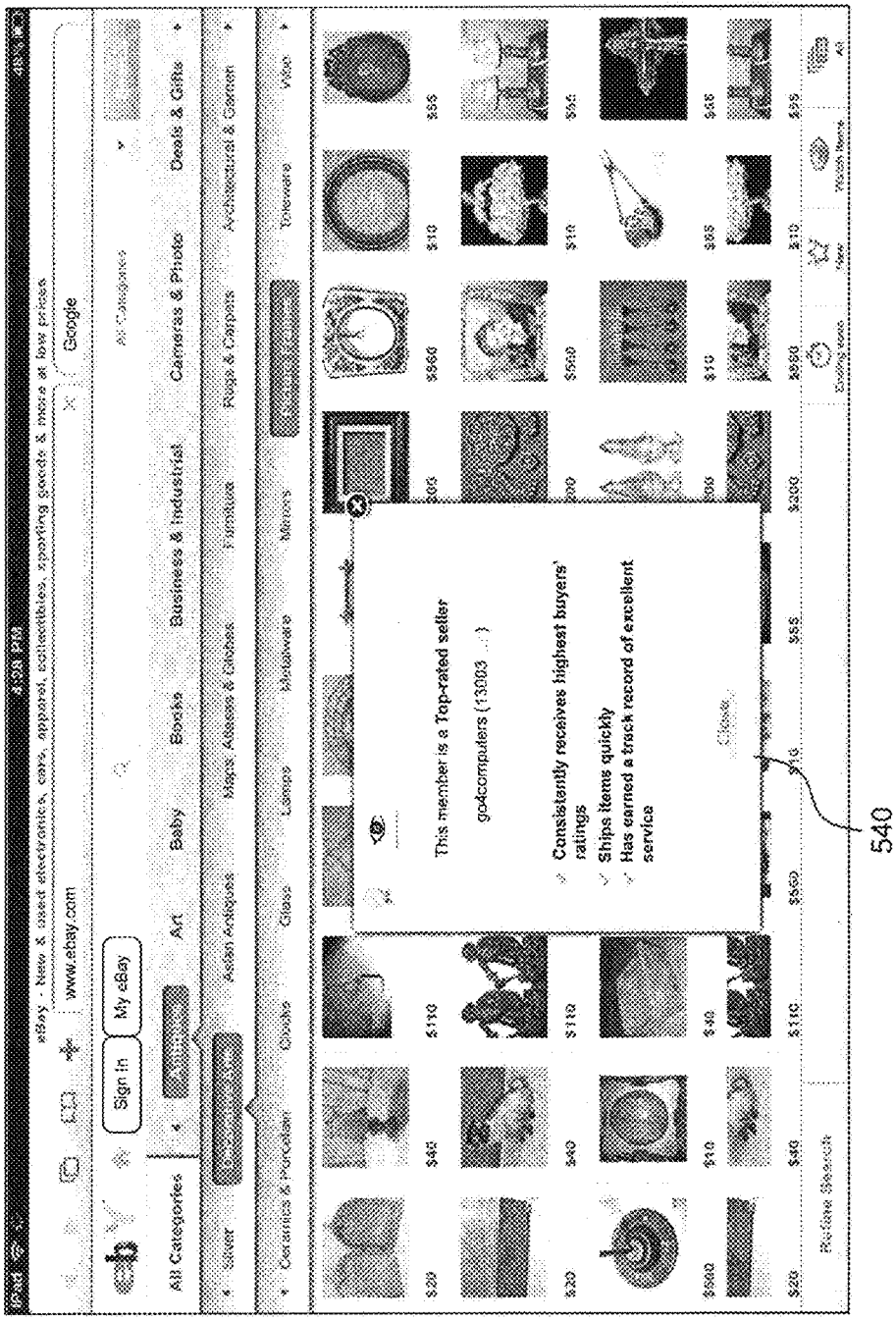

Additionally, the preview pop-up 540 may provide a seller badge icon 544. By selecting the seller badge icon 544, more information on the seller is presented such as the seller's rating. In one embodiment, the selection of the seller badge icon 544 causes the preview pop-up 540 to flip or revolve around to show the seller information. FIG. 5f illustrates one example of seller information being displayed in the preview pop-up 540.

The preview pop-up 540 may also provide a watch icon 546 (e.g., shown as an eye). If the user selects the watch icon 546, then the item will be added to a watch list of the user by the watch module 314.

Figure 6A:
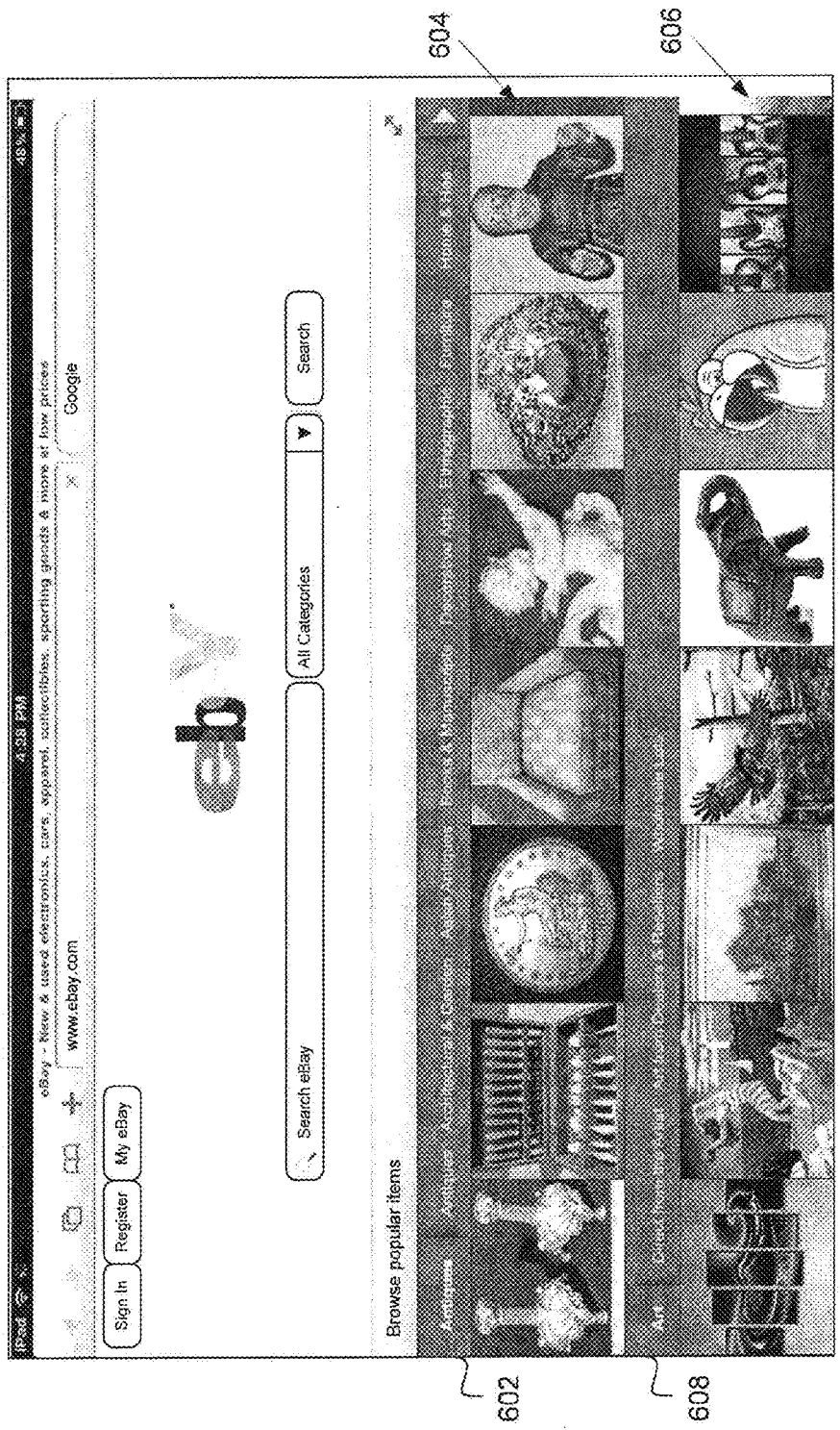
FIG. 6a-6b are example screenshots of a further embodiment for providing tablet web visual browsing.
Figure 6B:
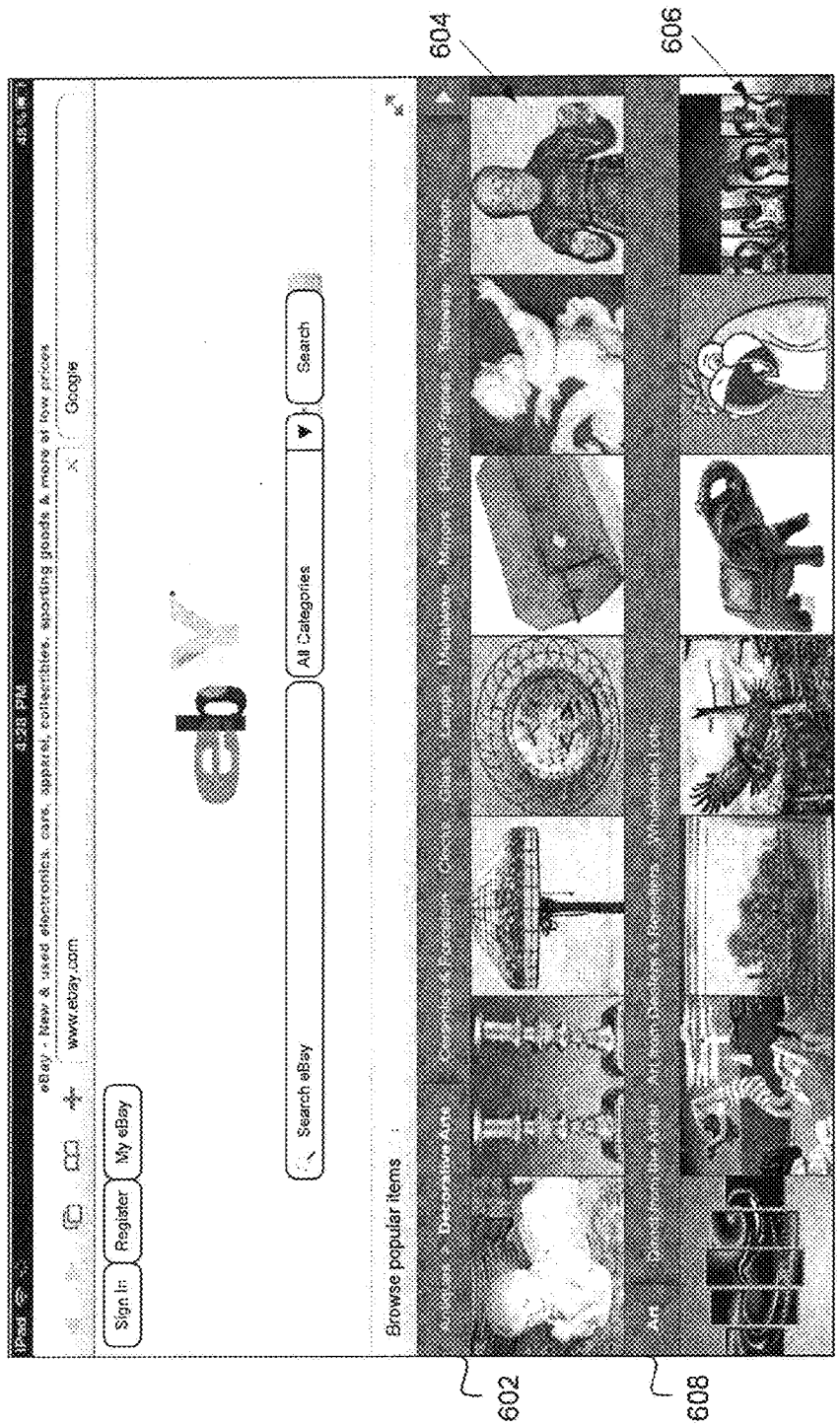

FIG. 6a-6b are example screenshots of a further embodiment for providing web visual browsing. In this embodiment, the user navigates through categories and subcategories along a horizontal text bar. Referring to FIG. 6a, a first text bar 602 is shown with the antique category selected in a first search area 604. As such, item selections for antique items are shown below the text bar 602. The text bar 602 also provides the subcategories to the right of the selected category. For example, subcategories for Asian antiques and decorative arts, among other subcategories, are provided to the right of the antique category. The text bar 602 may be scrolled across to identify further subcategories.

Below the first search area 604 is a second search area 606. Here, an art category is selected as shown in a second text bar 608. Item selections for art are displayed below the text bar 608. The text bar 608 also provides subcategories to the right of the selected category.

As the user slides the text bar 602 or 608 and selects subcategories, the category module 308 or the user interface engine 214 adds the subcategory to the right of the selected category and gives a next set of subcategories as shown in FIG. 6b. For example, in the first text bar 602, the user has selected the antiques category and a decorative arts subcategory. As a result, further subcategories for decorative arts are displayed to the right of the selected decorative arts subcategory including clocks, glass, lamps, and so forth. It is noted that the embodiment of FIG. 6a-6b allow for multiple searches to be conducted at the same time in different categories. Similar to the embodiment of FIG. 5a-5g, tapping or selecting an item selection may present a larger image of the item.

Figure 7:
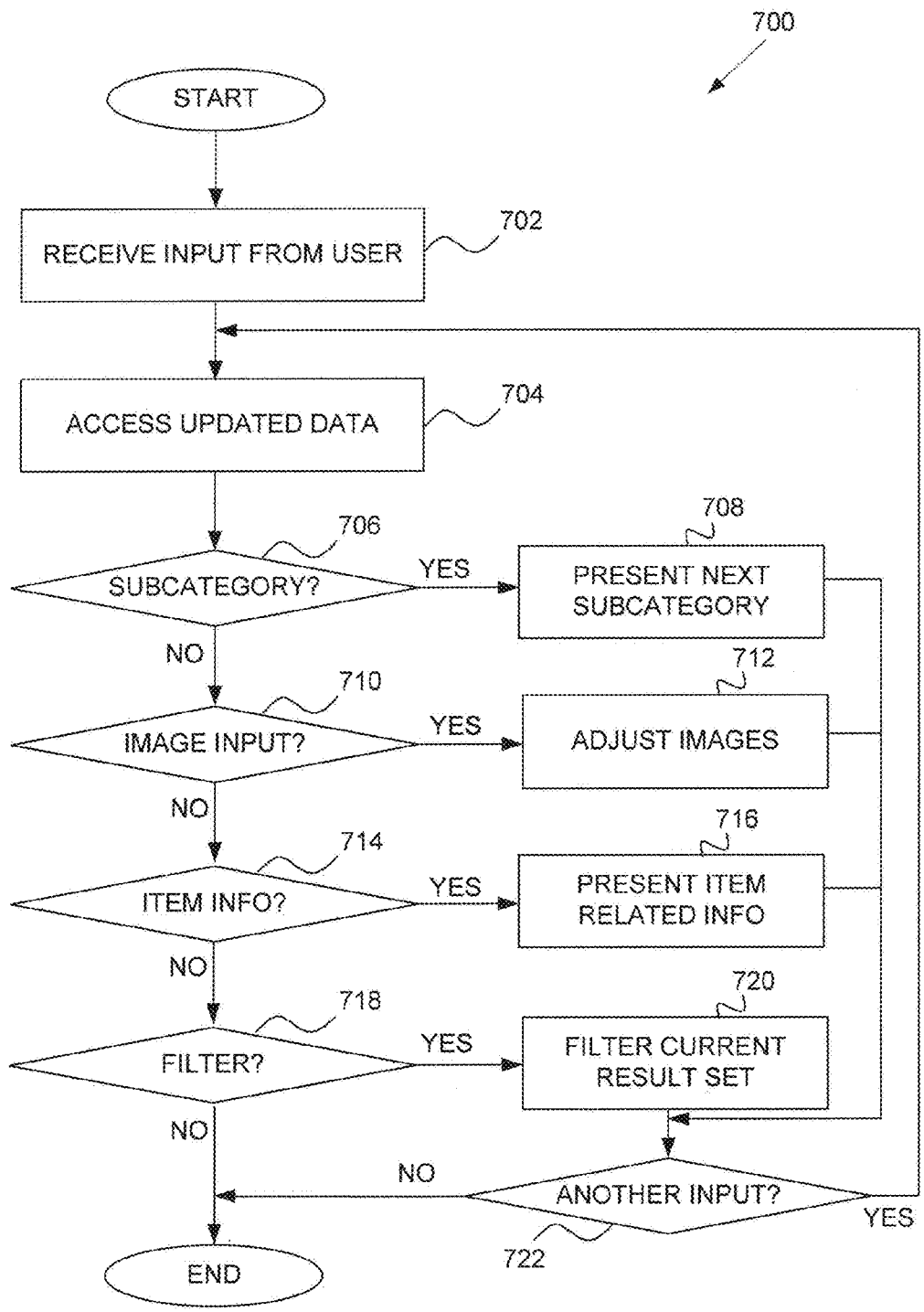
FIG. 7 is a flow diagram of an example high-level method for providing tablet web visual browsing.

FIG. 7 is a flow diagram of an example high-level method 700 for providing web visual browsing. Initially, a landing page is provided to a device of the user for display. Subsequently the user may provide an input in operation 702 to start navigating the website. The user input is a non-textual input such as a tap or swipe on a touchscreen of the device. The non-textual input is received by the input module 302. In response, data may be accessed in operation 704 by the data access module 304. The data may include item selections that may be updated in real-time. In some embodiments, operation 704 is optional.

In operation 706, a determination is made as to whether the user input is a selection of a category or subcategory. If the user input is a category or subcategory selection, then a next set of subcategories may be determined by the category module 308 and presented in operation 708. In some embodiments, the next set of subcategories may be provided in a subcategory display 436 or text bar 514 or 602.

If the user input is not a selection of a category or subcategory, then in operation 710, a determination is made as to whether the user input is an image input. If the user input is an image input, then the image(s) are adjusted in operation 712. For example, the user input may be a swipe on a slider bar 442 to the right. As a result of this swipe, the images may be enlarged with some item selections removed from the user interface in order for the remaining images to be enlarged. In another example, the user input may be a selection of a slideshow button 444 which results in a slideshow of item selections that are scrollable being presented.

If the user input is not an image input, then in operation 714, a determination is made as to whether the user input is a request for additional item information. If the user input is a request for additional item information, then the item related information is presented in operation 716. For example, if the user input is a selection of a seller badge icon 544, then the seller information may be presented to the user.

If the user input is not a selection a request for item information, then in operation 718, a determination is made as to whether the user input is a filter input. If the user input is a filter input, then the filter is applied by the filter module 312 to the current result set and a refined result set is presented to the user in operation 720.

In operation 722, a determination is made as to whether another input is received. If another input is received, then the method 700 returns to operation 704. It is noted that the method 700 of FIG. 7 is an example and that the operations of the method 700 may be performed in a different order, some operations may be removed or made optional, and some operations may be combined or otherwise performed in parallel. Additionally, other operations may be added such as, for example, allowing the user to purchase an item of interest.

Figure 8:
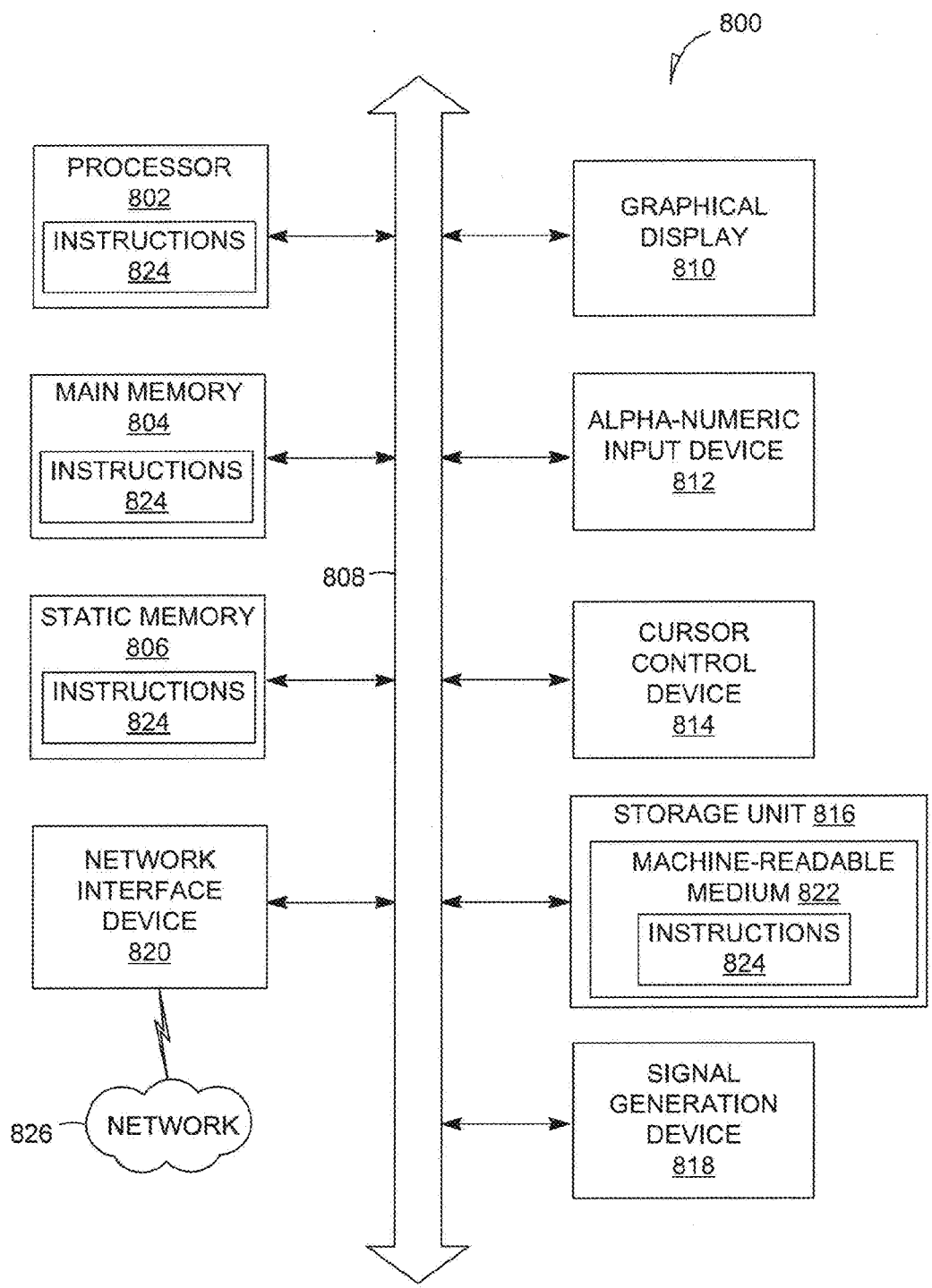
FIG. 8 is a simplified block diagram of a machine in an example form of a computing system within which a set of instructions for causing the machine to perform any one or more of the methodologies discussed herein may be executed.

FIG. 8 is a block diagram illustrating components of a machine 800, according to some example embodiments, able to read instructions from a machine-readable medium (e.g., a machine-readable storage medium) and perform any one or more of the methodologies discussed herein. Specifically, FIG. 8 shows a diagrammatic representation of the machine 800 in the example form of a computer system and within which instructions 824 (e.g., software, a program, an application, an applet, an app, or other executable code) for causing the machine 800 to perform any one or more of the methodologies discussed herein may be executed. In alternative embodiments, the machine 800 operates as a stand-alone device or may be connected (e.g., networked) to other machines. In a networked deployment, the machine 800 may operate in the capacity of a server machine or a client machine in a server-client network environment, or as a peer machine in a peer-to-peer (or distributed) network environment. The machine 800 may be a server computer, a client computer, a personal computer (PC), a tablet computer, a laptop computer, a netbook, a set-top box (STB), a personal digital assistant (PDA), a cellular telephone, a smartphone, a web appliance, a network router, a network switch, a network bridge, or any machine capable of executing the instructions 824, sequentially or otherwise, that specify actions to be taken by that machine. Further, while only a single machine is illustrated, the term "machine" shall also be taken to include a collection of machines that individually or jointly execute the instructions 824 to perform any one or more of the methodologies discussed herein.

The machine 800 includes a processor 802 (e.g., a central processing unit (CPU), a graphics processing unit (GPU), a digital signal processor (DSP), an application specific integrated circuit (ASIC), a radio-frequency integrated circuit (RFIC), or any suitable combination thereof), a main memory 804, and a static memory 806, which are configured to communicate with each other via a bus 808. The machine 800 may further include a graphics display 810 (e.g., a plasma display panel (PDP), a light emitting diode (LED) display, a liquid crystal display (LCD), a projector, or a cathode ray tube (CRT)). The machine 800 may also include an alpha-numeric input device 812 (e.g., a keyboard), a cursor control device 814 (e.g., a mouse, a touchpad, a trackball, a joystick, a motion sensor, or other pointing instrument), a storage unit 816, a signal generation device 818 (e.g., a speaker), and a network interface device 820.

The storage unit 816 includes a machine-readable medium 822 on which is stored the instructions 824 embodying any one or more of the methodologies or functions described herein. The instructions 824 may also reside, completely or at least partially, within the main memory 804, within the processor 802 (e.g., within the processor's cache memory), or both, during execution thereof by the machine 800. Accordingly, the main memory 804 and the processor 802 may be considered as machine-readable media. The instructions 824 may be transmitted or received over a network 826 via the network interface device 820.

As used herein, the term "memory" refers to a machine-readable medium able to store data temporarily or permanently and may be taken to include, but not be limited to, random-access memory (RAM), read-only memory (ROM), buffer memory, flash memory, and cache memory. While the machine-readable medium 822 is shown in an example embodiment to be a single medium, the term "machine-readable medium" should be taken to include a single medium or multiple media (e.g., a centralized or distributed database, or associated caches and servers) able to store instructions. The term "machine-readable medium" shall also be taken to include any medium, or combination of multiple media, that is capable of storing instructions for execution by a machine (e.g., machine 800), such that the instructions, when executed by one or more processors of the machine (e.g., processor 802), cause the machine to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" shall accordingly be taken to include, but not be limited to, one or more data repositories in the form of a solid-state memory, an optical medium, a magnetic medium, or any suitable combination thereof.

The instructions 824 may further be transmitted or received over a communications network 826 using a transmission medium via the network interface device 820 and utilizing any one of a number of well-known transfer protocols (e.g., HTTP). Examples of communication networks include a local area network (LAN), a wide area network (WAN), the Internet, mobile telephone networks, POTS networks, and wireless data networks (e.g., WiFi and WiMAX networks). The term "transmission medium" shall be taken to include any intangible medium that is capable of storing, encoding, or carrying instructions for execution by the machine, and includes digital or analog communications signals or other intangible medium to facilitate communication of such software.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute either software modules (e.g., code embodied on a machine-readable medium or in a transmission signal) or hardware modules. A "hardware module" is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a field-programmable gate array (FPGA) or an ASIC. A hardware module may also include programmable logic or circuitry that is temporarily configured by software to perform certain operations. For example, a hardware module may include software encompassed within a general-purpose processor or other programmable processor. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, a processor being an example of hardware. For example, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an application program interface (API)).

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Although an overview of the inventive subject matter has been described with reference to specific example embodiments, various modifications and changes may be made to these embodiments without departing from the broader spirit and scope of embodiments of the present invention. Such embodiments of the inventive subject matter may be referred to herein, individually or collectively, by the term "invention" merely for convenience and without intending to voluntarily limit the scope of this application to any single invention or inventive concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present invention. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present invention as represented by the appended claims. The specification and drawings are, accordingly, to be regarded in an illustrative rather than a restrictive sense.

What is claimed is:

1. A method comprising:
   determining an identity of the user of the mobile device;
   accessing user specific information for the user based on the identity;
   providing a landing page having a plurality of categories from which a user at a mobile device may begin a navigation to search for an item of interest, the landing page displaying a plurality of categories without displaying sub-categories of the plurality of categories, the providing the landing page further comprising presenting the user specific information on the landing page, the user specific information including alerts and status for previously selected items of interest;
   receiving a first touch input via a touchscreen of the mobile device, the first touch input indicating a selection of a category from the plurality of categories;
   based on the selected category, determining, using a processor of a machine, a plurality of subcategories of the selected category and a plurality of item selections identified within the selected category to display, each item selection of the plurality of item selections indicating an item available for purchase within the selected category;
   causing presentation of a user interface on the mobile device that presents the selected category, the plurality of subcategories, and the plurality of item selections identified within the selected category, each item selection of the plurality of item selections including an image depicting the item available for purchase within the selected category;
   receiving at least one further touch input applied to the user interface that is presenting the selected category, the plurality of subcategories, and the plurality of item selections available within the selected category that causes the user interface to be adjusted; and
   causing the adjusted user interface to be displayed on the touchscreen of the mobile device.

2. The method of claim 1, wherein the at least one further touch input comprises a selection of a subcategory, the method further comprising:
   refining the search result for item selections within the selected subcategory; and
   based on a further set of subcategories of the selected subcategory being available, presenting the further set of subcategories for user selection.

3. The method of claim 2, wherein the further set of subcategories is displayed horizontally on a text bar that includes the selected category and selected subcategory.

4. The method of claim 2, wherein the further set of subcategories is displayed within one or more text bars below a category bar, whereby each text bar represents a lower subcategory within a category tree.

5. The method of claim 1, wherein the at least one further touch input comprises a slider bar input, the adjustment to the user interface comprising:
   reducing a number of item selections of the search result displayed on the user interface;
   enlarging a display of one or more item selections remaining on the user interface after the reducing; and
   providing additional information on the enlarged display of the one or more item selections.

6. The method of claim 1, wherein the at least one further touch input comprises a selection of a slideshow button, the adjustment to the user interface comprising providing a slideshow whereby each slide is an item selection indicating the item available for purchase.

7. The method of claim 1, wherein the at least one further touch input comprises a selection of an item selection indicating the item available for purchase, the method further comprising: causing a pop-up window displaying an enlarged image of the item selection in response to the selection of the item selection.

8. The method of claim 1, wherein the at least one further touch input comprises a selection of a seller badge icon displayed in association with an item selection, the method further comprising causing a display of seller information including a seller rating to be presented in a pop-up window in response to the selection of the seller badge.

9. The method of claim 1, wherein the at least one further touch input comprises a selection of a watch icon displayed in association with the item of interest, the method further comprising adding the item of interest to a watch list of items that the user is watching.

10. The method of claim 1, wherein the at least one further touch input comprises a filter selection, the method further comprising:
    performing a filter of the search result based on the filter selection to determine a refined result set of items available for purchase; and
    providing the refined result set for display on the mobile device.

11. The method of claim 1, wherein the alerts and status displayed on the landing page for the previously selected items of interest comprise a selection from the group consisting of an indication that the user is outbid on an item, an indication that an offer has been accepted on an item, an indication that an offer is pending on an item, an indication that the user won or lost an item, an indication that a payment is required for an item, and an indication that feedback is requested for an item.

12. The method of claim 1, further comprising:
    identifying, based on an agent string, that the user is accessing the landing page using a mobile device;
    in response to the identifying based on the agent string, determining a corresponding web for the mobile device; and
    redirecting the mobile device to the corresponding web, the corresponding web being selected from a group consisting of a tablet web and a smartphone web.

13. A machine-readable storage device storing instructions which, when executed by the at least one processor of a machine, causes the machine to perform operations comprising:
    determining an identity of the user of the mobile device;
    accessing user specific information for the user based on the identity;
    providing a landing page having a plurality of categories from which a user at a mobile device may begin a navigation to an item of interest, the landing page displaying a plurality of categories without displaying sub-categories of the plurality of categories, the providing the landing page further comprising presenting the user specific information on the landing page, the user specific information including alerts and status for previously selected items of interest;
    receiving a first touch input via a touchscreen of the mobile device, the first ouch input indicating a selection of a category from the plurality of categories;
    based on the selected category, determining a plurality of subcategories of the selected category and a plurality of item selections identified within the selected category to display, each item selection of the plurality of item selections indicating an item available for purchase within the selected category;
    causing presentation of a user interface on the mobile device that presents the selected category, the plurality of subcategories, and the plurality of item selections identified within the selected category, each item selection of the plurality of item selections including an image depicting the item available for purchase within the selected category;
    receiving at least one further touch input applied to the user interface that is presenting the selected category, the plurality of subcategories, and the plurality of item selections available within the selected category that causes the user interface to be adjusted; and
    causing the adjusted user interface to be displayed on the touchscreen of the mobile device.

14. The machine-readable storage device of claim 13, wherein the at least one further touch input comprises a selection of a subcategory, the operations further comprising:
    refining the search result for item selections within the selected subcategory; and
    based on a further set of subcategories of the selected subcategory being available, presenting the further set of subcategories for user selection, the presenting occurring on one or more text bars that include the selected category and selected subcategory.

15. The machine-readable storage device of claim 13, wherein the at least one further touch input comprises a slider bar input, the adjustment to the user interface comprising:
    reducing a number of item selections of the search result displayed on the user interface;
    enlarging a display of one or more item selections remaining on the user interface after the reducing; and
    providing additional information on the enlarged display of the one or more item selections.

16. The machine-readable storage device of claim 13, wherein the at least one further touch input comprises a selection of a slideshow button, the adjustment to the user interface comprising providing a slideshow whereby each slide is an item selection indicating the item available for purchase.

17. The machine-readable storage device of claim 13, wherein the at least one further touch input comprises a selection of an item selection indicating the item available for purchase, the operations further comprising causing a pop-up window displaying an enlarged image of the item selection in response to the selection of the item selection.

18. The machine-readable storage device of claim 13, wherein the at least one further touch input comprises a selection of a seller badge icon displayed in association with an item selection, the operations further comprising causing a display of seller information including a seller rating to be presented in a pop-up window in response to the selection of the seller badge.

19. The machine-readable storage device of claim 13, wherein the at least one further touch input comprises a selection of a watch icon displayed in association with the item of interest, the operations further comprising adding the item of interest to a watch list of items that the user is watching.

20. A system comprising:
    one or more processors configured to perform operations comprising:
        determining an identity of the user of the mobile device;
        accessing user specific information for the user based on the identity;
        providing a landing page having a plurality of categories from which a user at a mobile device may begin a navigation to access information for an item of interest, the landing page displaying a plurality of categories without displaying sub-categories of the plurality of categories, the providing the landing page further comprising presenting the user specific information on the landing page, the user specific information including alerts and status for previously selected items of interest;
        receiving a first touch input via a touchscreen of the mobile device, the first touch input indicating a selection of a category from the plurality of categories; and determining, based on the selected category, a plurality of subcategories of the selected category and a plurality of item selections identified within the selected category to display, each item selection of the plurality of item selections indicating an item available for purchase within the selected category, causing presentation of a user interface on the mobile device that presents the selected category, the plurality of subcategories, and the plurality of items selections identified within the selected category, each item selection of the plurality of item selections including an image depicting the item available for purchase within the selected category, receiving at least one further touch input applied to the user interface that is presenting the selected category, the plurality of subcategories, and the plurality of item selections available within the selected category that causes the user interface to be adjusted, and causing the adjusted user interface to be displayed on the touchscreen of the mobile device.

* * * * *

UNITED STATES PATENT AND TRADEMARK OFFICE
CERTIFICATE OF CORRECTION

PATENT NO. : 9,459,767 B2
APPLICATION NO. : 13/595363
DATED : October 4, 2016
INVENTOR(S) : Cockcroft et al.

It is certified that error appears in the above-identified patent and that said Letters Patent is hereby corrected as shown below:

In the Claims

In Column 17, Line 16, in Claim 11, after "that", delete "a", therefor

In Column 17, Line 46, in Claim 13, delete "ouch" and insert --touch--, therefor Signed and Sealed this
Fifth Day of June, 2018

Andrei Iancu
*Director of the United States Patent and Trademark Office*